(12) United States Patent
Abercrombie et al.

(10) Patent No.: US 12,032,892 B2
(45) Date of Patent: Jul. 9, 2024

(54) SEMICONDUCTOR LAYOUT CONTEXT AROUND A POINT OF INTEREST

(71) Applicant: Siemens Industry Software Inc., Plano, TX (US)

(72) Inventors: David A. Abercrombie, Apex, NC (US); Mohamed Alimam Mohamed Selim, Tokyo (JP); Mohamed Bahnas, Cupertino, CA (US); Hazem Hegazy, Cairo (EG); Ahmed Hamed Fathi Hamed, Giza (EG)

(73) Assignee: Siemens Industry Software Inc., Plano, TX (US)

( * ) Notice: Subject to any disclaimer, the term of this patent is extended or adjusted under 35 U.S.C. 154(b) by 16 days.

(21) Appl. No.: 17/638,315

(22) PCT Filed: Aug. 30, 2019

(86) PCT No.: PCT/US2019/049066
§ 371 (c)(1),
(2) Date: Feb. 25, 2022

(87) PCT Pub. No.: WO2021/040733
PCT Pub. Date: Mar. 4, 2021

(65) Prior Publication Data
US 2022/0309222 A1    Sep. 29, 2022

(51) Int. Cl.
*G06F 30/392* (2020.01)
*G06F 30/27* (2020.01)
*G06F 119/18* (2020.01)

(52) U.S. Cl.
CPC ............ *G06F 30/392* (2020.01); *G06F 30/27* (2020.01); *G06F 2119/18* (2020.01)

(58) Field of Classification Search
USPC .......................................................... 716/119
See application file for complete search history.

(56) References Cited

U.S. PATENT DOCUMENTS

| 6,081,658 A | 6/2000 | Rieger et al. |
| 2017/0123322 A1* | 5/2017 | Saïb ................... H01J 37/3174 |

OTHER PUBLICATIONS

PCT International Search Report and Written Opinion of International Searching Authority dated May 13, 2020 corresponding to PCT International Application No. PCT/US2019/049066 filed Aug. 30, 2019.

(Continued)

*Primary Examiner* — Bryce M Aisaka

(57) ABSTRACT

Systems and methods for analyzing a semiconductor layout design around a point of interest (POI) are disclosed. Semiconductor layout designs are a representation of an integrated circuit in terms of planar geometric shapes which make up the components of the integrated circuit, and are used to manufacture the integrated circuit. The layout design may be analyzed using one or more POI-based approaches to determine whether to modify the layout design. In one POI-based approach, set of kernels, tailored to the downstream application, are convolved with a representation of the layout design about or around the POI in order to generate a signature associated with the POI. In turn, the signatures may be analyzed based on the downstream application. Another POI-based approach consists of analyzing geometrical parameters associated with the POI, which may be used during a design stage to identify and modify problem areas in the layout design.

20 Claims, 19 Drawing Sheets

(56) References Cited

OTHER PUBLICATIONS

Jason P. Cain, Moutaz Fakhry, Piyush Pathak, Jason Sweis, Frank E. Gennari, Ya-Chieh Lai, "Pattern-based analytics to estimate and track yield risk of designs down to 7nm" Proc. SPIE 10148, Design-Process-Technology Co-optimization for Manufacturability XI. Mar. 30, 2017.

* cited by examiner

All clips go to the classification engine

Clustering Results

Input Data = 762K unique entries

| Tolerance | Clusters |
|---|---|
| 1e-4 | 762 K |
| 1e-3 | 752 K |
| 1e-2 | 667 K |
| 0.05 | 410 K |
| 0.1 | 247 K |
| 0.5 | 13 K |
| 0.53 | 11 K |
| 0.55 | 10 K |
| 0.6 | 7.6 K |
| 0.7 | 4.2 K |
| 0.8 | 2.2 K |

| | Input Data (Unique POIs output from conventional edge-based Pattern Match) | Convolution with kernels of different Halos (i.e., Feature Vector generation) | | |
|---|---|---|---|---|
| | Original | 200nm | 140nm | 100nm |
| Clusters Count | 51M | 40.4M | 26.6M | 10.2M |

FIG. 6N

| POI_no | Line-end width | Line end to opposite line | line end to side line (left side) | line end to side line (right side) | line end to side line run length (left side) | line end to side line run length (right side) | Distance from POI to Convex Edges (left side) | Distance from POI to Convex Edges (right side) | ... | Line-End Pull-Back/Extension |
|---|---|---|---|---|---|---|---|---|---|---|
| POI_01 | X1,01 | X2,01 | X3,01 | X4,01 | X5,01 | X6,01 | X7,01 | X8,01 | ... | Y1 |
| POI_02 | X1,02 | X2,02 | X3,02 | X4,02 | X5,02 | X6,02 | X7,02 | X8,02 | ... | Y2 |
| POI_03 | X1,03 | X2,03 | X3,03 | X4,03 | X5,03 | X6,03 | X7,03 | X8,03 | ... | Y3 |
| ... | ... | ... | ... | ... | ... | ... | ... | ... | ... | ... |
FIG. 11
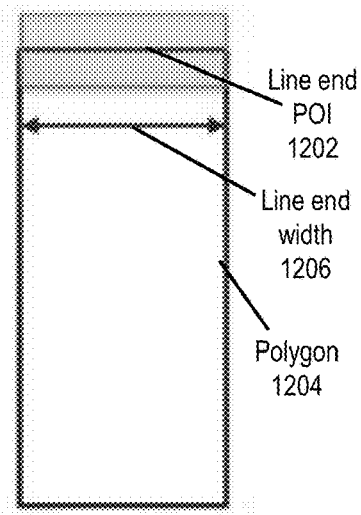
FIG. 12A
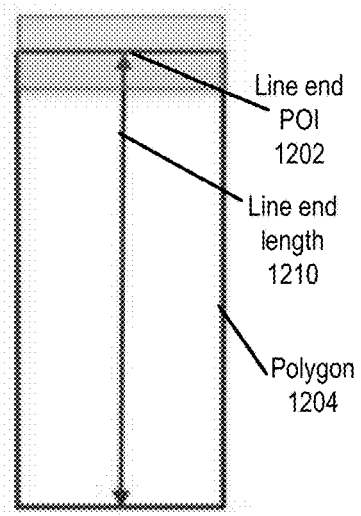
FIG. 12B
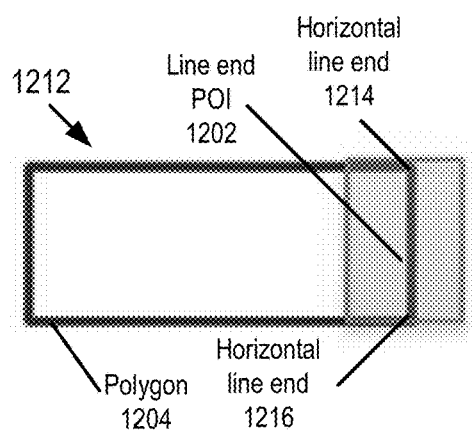
FIG. 12C
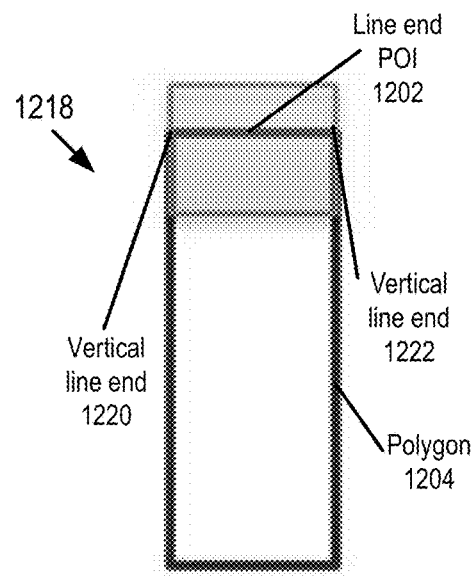
FIG. 12D

SEMICONDUCTOR LAYOUT CONTEXT AROUND A POINT OF INTEREST

FIELD

The present disclosure relates to the field of semiconductor layout analysis, and specifically relates to determining semiconductor layout context around a point of interest.

BACKGROUND

Electronic circuits, such as integrated microcircuits, are used in a variety of products, from automobiles to microwaves to personal computers. Designing and fabricating integrated circuit devices typically involves many steps, sometimes referred to as a "design flow." The particular steps of the design flow often are dependent upon the type of integrated circuit, its complexity, the design team, and the integrated circuit fabricator or foundry that will manufacture the microcircuit. Typically, software and hardware "tools" verify the design at various stages of the design flow by running software simulators and/or hardware emulators. These steps aid in the discovery of errors in the design, and allow the designers and engineers to correct or otherwise improve the design.

For example, a layout design (interchangeably referred to as a layout) may be derived from an electronic circuit design. The layout design may comprise an integrated circuit (IC) layout, an IC mask layout, or a mask design. In particular, the layout design may be a representation of an integrated circuit in terms of planar geometric shapes which correspond to the patterns of metal, oxide, or semiconductor layers that make up the components of the integrated circuit. The layout design can be one for a whole chip or a portion of a full-chip layout design.

Typically, modeling and simulation applications analyze the layout design around a point of interest (POI), whose manufacturing behavior is being modeled or simulated as well as first principles information about the process physics of the associated layer. As one example, the POI may comprise a point in the layout design that has coordinates (x, y).

Traditionally, the context of the layout design is captured as some form of image or pattern, with the modeling and simulation applications focusing on the image or pattern as part of the requisite analysis. Further, the process physics are captured as engineering data and formula entry. However, since the layout design may be exceedingly complex, with layouts patterns potentially numbering in the billions per layout design, such analysis is a challenge both for computational time and for memory requirements.

SUMMARY

In one embodiment, a computer-implemented method for analyzing a plurality of points of interest (POIs) in a semiconductor layout design for a downstream application is disclosed. The method includes: accessing one or more kernels based on the downstream application, the one or more kernels when convolved with a representation of the semiconductor layout design extracting at least one feature associated with the plurality of POIs, the extracted at least one feature for use by the downstream application; for a respective POI of the plurality of POIs, convolving the one or more kernels with the representation of the semiconductor layout design in order to generate a signature for the respective POI, the signature comprising a numerical representation indicative of the extracted at least one feature associated with the respective POI; and analyzing, based on the downstream application, the signature for the extracted at least one feature associated with the respective POI.

In another embodiment, a system for analyzing a plurality of POIs in a semiconductor layout design for a downstream application is disclosed. The system includes: one or more processors, the one or more processors programmed to perform the following method: accessing one or more kernels based on the downstream application, the one or more kernels when convolved with a representation of the semiconductor layout design extracting at least one feature associated with the plurality of POIs, the extracted at least one feature for use by the downstream application; for a respective POI of the plurality of POIs, convolving the one or more kernels with the representation of the semiconductor layout design in order to generate a signature for the respective POI, the signature comprising a numerical representation indicative of the extracted at least one feature associated with the respective POI; and analyzing, based on the downstream application, the signature for the extracted at least one feature associated with the respective POI.

In another embodiment, one or more non-transitory computer-readable media storing computer-executable instructions when executed causing one or more processors to analyze a plurality of POIs in a semiconductor layout design for a downstream application is disclosed. In particular, the computer-executable instructions when executed cause the one or more processors to perform the following: accessing one or more kernels based on the downstream application, the one or more kernels when convolved with a representation of the semiconductor layout design extracting at least one feature associated with the plurality of POIs, the extracted at least one feature for use by the downstream application; for a respective POI of the plurality of POIs, convolving the one or more kernels with the representation of the semiconductor layout design in order to generate a signature for the respective POI, the signature comprising a numerical representation indicative of the extracted at least one feature associated with the respective POI; and analyzing, based on the downstream application, the signature for the extracted at least one feature associated with the respective POI.

In still another embodiment, a computer-implemented method for analyzing a plurality of points of interest (POIs) in a semiconductor layout design for a downstream application is disclosed. The method includes: for a respective POI, obtaining values for one or more geometrical parameters with respect to a polygon of the respective POI and with respect to at least one other polygon in a context around the respective POI; and analyzing, based on the downstream application, the values for the one or more geometrical parameters.

In yet another embodiment, a system for analyzing a plurality of POIs in a semiconductor layout design for a downstream application is disclosed. The system includes: one or more processors, the one or more processors programmed to perform the following method: for a respective POI, obtaining values for one or more geometrical parameters with respect to a polygon of the respective POI and with respect to at least one other polygon in a context around the respective POI; and analyzing, based on the downstream application, the values for the one or more geometrical parameters.

In still another embodiment, one or more non-transitory computer-readable media storing computer-executable instructions when executed causing one or more processors to analyze a plurality of POIs in a semiconductor layout design for a downstream application is disclosed. In particular, the computer-executable instructions when executed cause the one or more processors to perform the following: for a respective POI, obtaining values for one or more geometrical parameters with respect to a polygon of the respective POI and with respect to at least one other polygon in a context around the respective POI; and analyzing, based on the downstream application, the values for the one or more geometrical parameters.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIGS. 6J-L are a set of 3 tophat kernels for convolution.

FIG. 6M is a table of the number of output clusters versus clustering tolerance.

FIG. 6N is a table of the number of unique POIs versus convolution halo radius.

FIG. 11 is an example table of parameter values associated with different POIs.

DETAILED DESCRIPTION OF EMBODIMENTS

General Considerations

Figure 1:
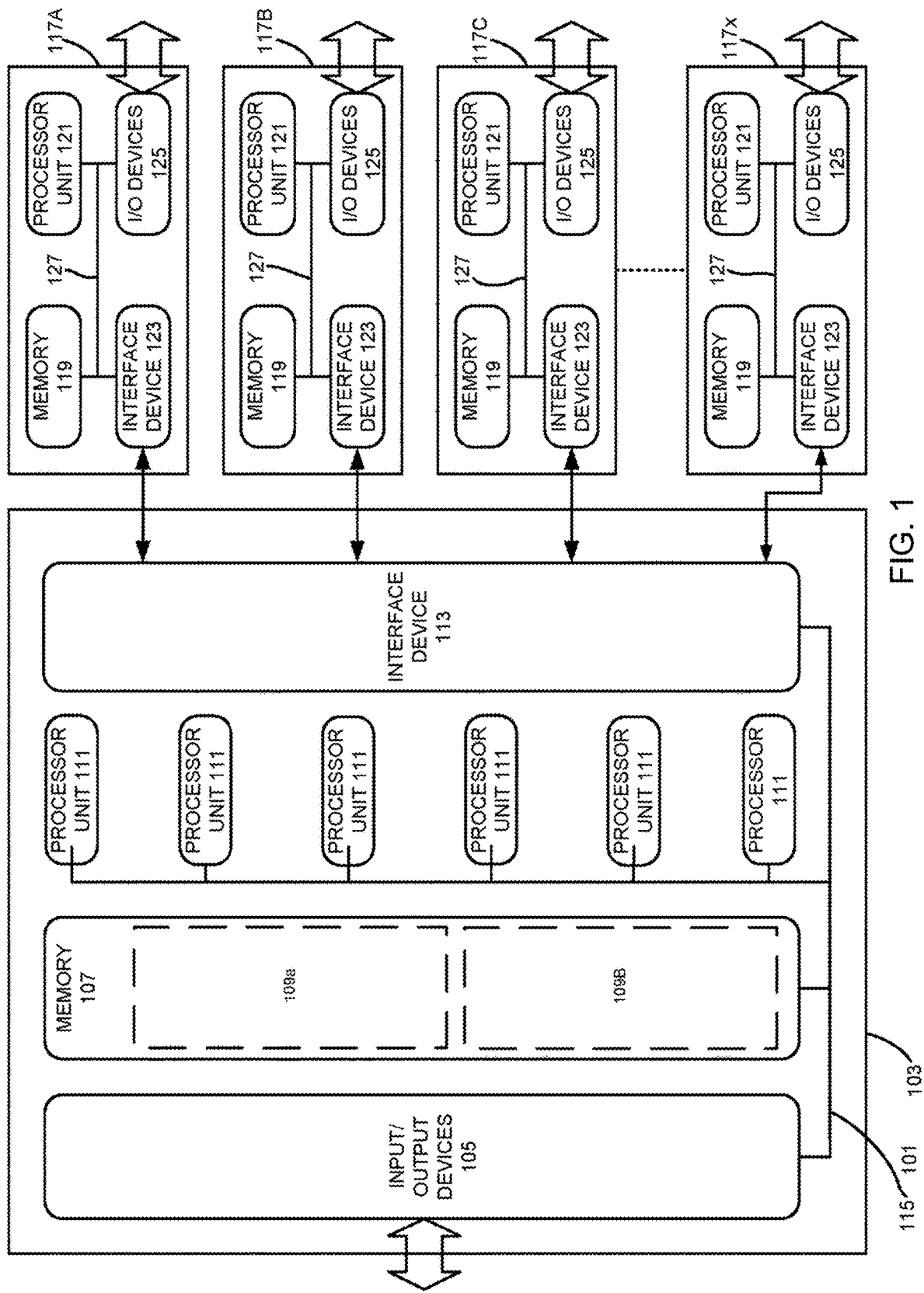
FIG. 1 illustrates an example of a computing system that may be used to implement various embodiments of the disclosed technology.

Various aspects of the present disclosed technology relate to extracting features from a layout design and analyzing the features for a downstream application. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on one or more non-transitory computer-readable media, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "perform", "generate," "access," and "determine" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one micro device, such as data to be used to form multiple micro devices on a single wafer.

Illustrative Operating Environment

The execution of various electronic design processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

In FIG. 1, the computer network 101 includes a master computer 103. In the illustrated example, the master computer 103 is a multi-processor computer that includes a plurality of input/output devices 105 and a memory 107. The input/output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include non-magnetic and magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations, such as the operations disclosed herein. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device, a graphics processor unit (GPU) device, or the like. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations, include using an application-specific integrated circuit (ASIC) or a field programmable gate array (FPGA). The interface device 113, the processor units 111, the memory 107 and the input/output devices 105 are connected together by a bus 115.

Figure 2:
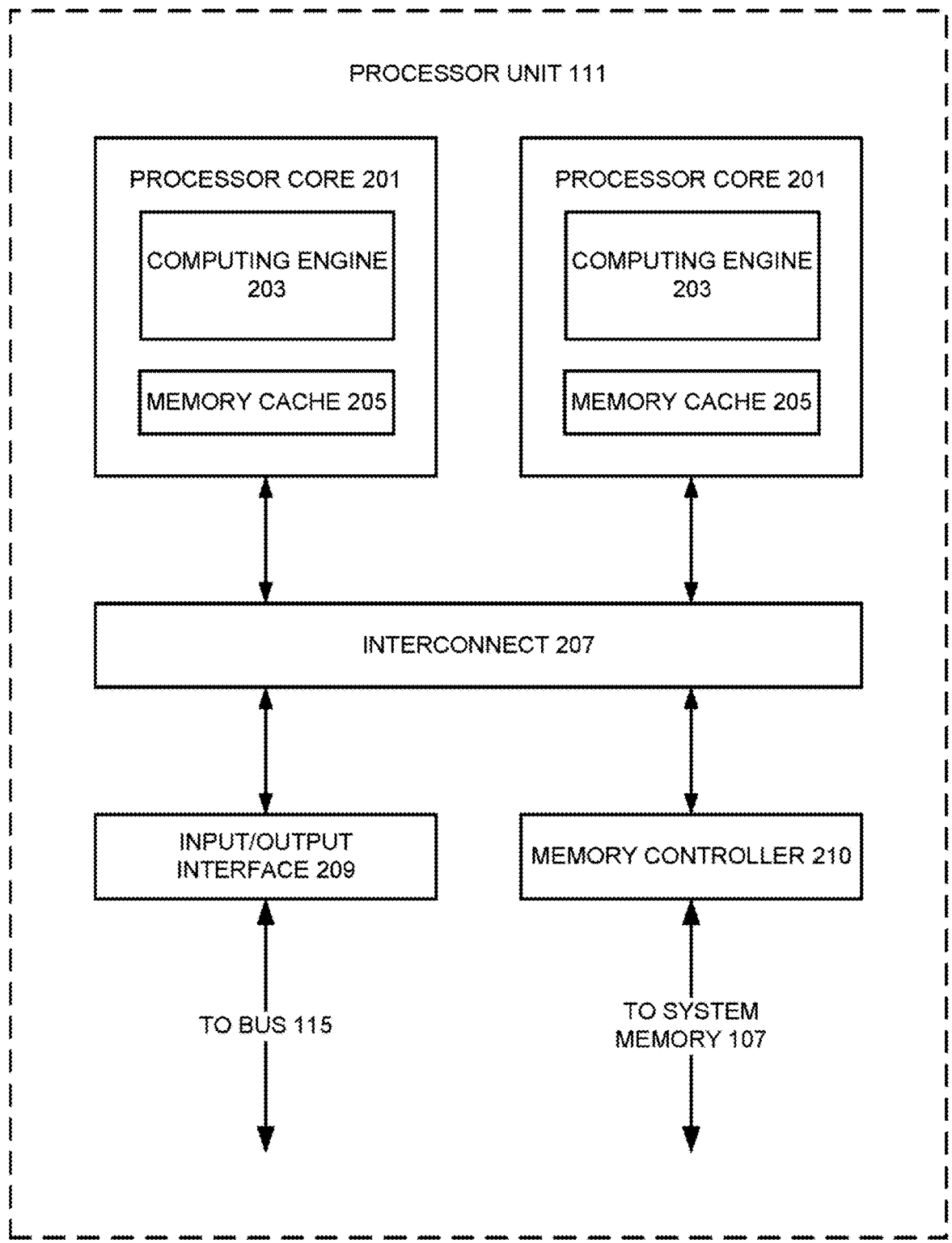
FIG. 2 illustrates an example of a multi-core processor unit that may be used to implement various embodiments of the disclosed technology.

With some implementations of the disclosed technology, the master computer 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations (e.g., using an ASIC or an FPGA). Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Layout Context Around a Point of Interest

As discussed in the background, analysis of layout context around a point of interest typically focuses on image analysis, such as focusing on edge-based pattern matching solutions. However, the traditional image analysis highlights two problems. First, the dataset used for the image analysis is identical in informational density, and is thus limiting, particularly for different types of layout context analysis. For example, each pixel in a bitmap dataset represents the same information for each point in the image. In particular, the layout design may be described in a layout design file, which contains a set of polygons (e.g., patterns) that represents what should be printed on the silicon wafer on a certain layer. One example of a layout design file comprises a pattern file whereby each coordinate represents a simple point in a grid with no additional information captured, with the data storage taking the form of a bitmap or compressed bitmap image data or coordinate polygonal databases. These datasets are essentially single parameter inputs (i.e., polygon layer coordinates/pixels) or few parameters (i.e., multiple layer coordinates/pixels). Second, focusing on image analysis pattern matching is both computationally expensive and inherently limiting.

As discussed in the background, potentially billions of patterns may be subject to analysis, creating a bottleneck as to performance and similarity criteria (e.g., fuzziness). For example, existing edge-based pattern matching performs the analysis, but is limited in its similarity criteria to edge-based shifts. In particular, for several semiconductor manufacturing processes, recognizing repeated patterns currently uses the edge-based pattern match but is limited to the highly repetitive and exact matching types of patterns (e.g., array-like) and cannot be applied to random logic designs. Further, for hotspot detection, primitive edge-based pattern match for known hotspots is used; however, such analysis fails to detect the hotspot probability of first-seen new patterns (unless the new pattern is a very similar to known hotspots). In this regard, hotspot detection, which may rely on pixel-based matching techniques, is computationally and memory expensive. Further, other analyses, including yield enhancement or risk assessment, are limited when using the primitive edge-based pattern matching methodology.

Thus, in one or some embodiments, one or both of the following is performed including: (1) expanding the information content associated with a POI in the layout context beyond the typical image analysis; and/or (2) tailoring the information content associated with the POI and/or the analysis of the information content associated with the POI to the specific downstream application (e.g., tailoring what information content is obtained regarding the POI to the specific downstream application and/or analyzing the information content regarding the POI tailored to the specific downstream application). In this way, modeling and/or simulation applications that rely on characterization of the POI may be improved, as discussed in more detail below.

Further, the POI-based analysis may be performed at one or more stages of the development process. Example stages includes, without limitation, the design stage and the manufacturing stage. The design stage includes generating a layout design, during which the designer of the layout design may not know or may not consider the specifics of manufacturing (such as light exposure and process specifics). In contrast, the manufacturing stage includes analyzing/revising the layout design, during which the manufacturer may know or consider the specifics of light exposure (e.g., any one, any combination, or all of: image in resist intensity; dose; wavelength) and resist model specifics (e.g., any one, any combination, or all of: resist K value or resist absorbance coefficient; resist film thickness; resist model kernels and thresholds).

The information content/analysis associated with the POI may be directed to extracting features tailored to the downstream application, and more specifically be tailored to the downstream application at the specific stage of the development process. In one or some embodiments, one manner of extracting features associated with a POI is by using kernel(s), tailored to the downstream application, which are convolved with a representation of the layout design about or around the POI in order to generate a signature associated with the POI. As one example, in the manufacturing stage with knowledge of some or all of the specifics of manufacturing (such as one or both of light exposure specifics and resist model specifics), the kernels may be selected to extract features associated with the POI in order to perform downstream applications during the manufacturing stage, as discussed in more detail below.

The kernel, interchangeably referred to as a convolution matrix or mask, may comprise a matrix that is used to extract one or more features of the context about or around the POI. As discussed further below, convolutions may be performed with the kernel in fixed relation to the POI (e.g., the center of the kernel coincides with the POI; the kernel is positioned relative to the POI, such as to the left, right, top, or bottom relative to the POI). The signature, with its resulting values generated from the convolution of the context around the POI with a set of defined kernels, may then be analyzed with regard to the downstream application (e.g., for hotspot detection; OPC; etc.). In other embodiments, another manner of extracting features associated with the POI is performed using one or more parameters that comprise measurements related to or associated with the POI. As discussed further below, the parameters obtained (e.g., for different types of POIs and/or for different downstream applications, obtaining different sets of parameters) and/or the analysis of the parameters may be tailored to the downstream application.

Various downstream applications are contemplated including: (1) optical proximity correction (OPC), such as for generating OPC correction values (see e.g., US Patent Application Publication No. 2014/0215416 A1 and US Patent Application Publication No. 2019/0155142 A1, both of which are incorporated by reference herein in their entirety); (2) sub resolution assist feature (SRAF) placement; (3) hotspot detection (see e.g., US Patent Application Publication No. 2014/0089877 A1 and US Patent Application Publication No. 2019/0087526 A1, both of which are incorporated by reference herein in their entirety); and (4) retargeting of layout design (e.g., layout reduction). Other downstream applications are contemplated.

Thus, in one or some embodiments, a signature (interchangeably referred to as a feature vector) is generated by convolving a set of kernels (e.g., a set of 2-D images) with a representation of the layout design (e.g., a grid). Specifically, the signature includes a set of values, with each value resulting from convolution of a respective kernel in the set with a part of the grid (or other representation of the layout design). For example, a respective set of kernels may comprise a predetermined number, such as at least 2 kernels, at least 3 kernels, at least 4 kernels, at least 5 kernels, at least 10 kernels, at least 15 kernels, at least 20 kernels, at least 25 kernels, at least 30 kernels, at least 40 kernels, at least 50 kernels, etc. The convolution of the set of kernels results in the set of values for the signature (e.g., for a set of kernels having a first kernel, a second kernel, and a third kernel, convolution of the first kernel with the grid results in a first value, convolution of the second kernel with the grid results in a second value, and convolution of the third kernel with the grid results in a third value). As discussed below, various types of kernels are available. The kernels for convolution may be selected to extract features from the representation of the layout design that are relevant to the specific downstream application. In that regard, different sets of kernels may be tailored to extract different features relevant to the different downstream applications.

As discussed in more detail below, the set of kernel(s) may be selected based on any one, any combination, or all of: (1) a type of POI (e.g., whether the POI reside on an edge, such as a line end, of a polygon in the layout design or the POI resides internal to a polygon in the layout design); (2) a downstream application; or (3) one or more aspects of the layout design (e.g., a type of technology (e.g., a first nm technology (e.g., 10 nm technology) using a first set of kernels for convolution versus a second nm technology (e.g., 20 nm technology) using a second set of kernels for convolution, with the first set of kernels being different from the second set of kernels) and/or a type of layer (e.g., a first material layer, such as a metal layer, using a first set of kernels for convolution versus a second material layer, such as diffusion, using a second set of kernels for convolution, with the first set of kernels being different from the second set of kernels)). For example, a first set of kernels may be associated with OPC and may be used to generate respective signatures for POIs in the layout design, a second set of kernels (different from the first set of kernels) may be associated with hotspot detection and may be used to generate respective signatures for POIs in the layout design, etc. As another example, one or both of the number of kernels or the type of kernels may depend on the downstream applications. In particular, a first downstream application that focuses more on an area nearer to the POI may use fewer kernels (kernel 1 and kernel 2) whereas a second downstream application that focuses more on a larger area around the POI may use a greater number of kernels (kernel 1, kernel 2, and kernel 3). Thus, using the kernels, the extraction of information from the layout design may be tailored for ultimate analysis of the signatures.

Kernels may vary based on any one, any combination, or all of: shape (e.g., circles, rings, squares, rectangles); orientation (e.g., being orientation dependent versus orientation independent); size; function (e.g., tophat kernel following a step function; Gaussian kernel following a Gaussian distribution); or halo/extension (e.g., for a same function, such as a Gaussian kernel function, different kernels may be obtained for varying halo). As discussed in more detail below, precision may comprise a measure of granularity and may define the sampling during simulation of both the kernel and the layout.

As one example, one set of kernels, such as the hotspot detection kernels, may be orientation independent (e.g., a set of concentric circles that is not dependent on the orientation of the POI in the layout design). Another set of kernels may be orientation dependent (e.g., the kernel is convolved with a portion of the grid positioned to the direct left of the POI; kernel is convolved with a portion of the grid positioned to the upper or the lower left of the POI; kernel is convolved with a portion of the grid positioned to the direct right of the POI; kernel is convolved with a portion of the grid positioned to the upper or lower right of the POI; etc.). In this way, for example, kernels may generate values for horizontal polygons differently from vertical polygons, to the extent that such a characteristic is relevant to the downstream application. Further, kernels may vary relative to one another (e.g., whether the kernels in a set are mutually exclusive of one another; whether the kernels in the set at least partly overlap one another; distance between the kernels in the set; etc.). Thus, the selection of the set of kernels, and in turn the signatures generated from the kernels, may extract informational content (e.g., one or more features) that are tailored to the specific downstream application (e.g., OPC versus hotspot detection), unlike traditional pixel-based image analysis.

In turn, the generated signatures may be analyzed for the specific downstream application. The signatures may comprise a series or a set of values, as discussed above. Further, as discussed above, various downstream applications are contemplated including without limitation: quantifying the similarity of various patterns from different sources/layouts; OPC runtime acceleration by recognizing repeated (e.g., previously computed) solutions; new hotspot detection based on its pattern similarity to known hotspots in a pattern library; sub resolution assist feature (SRAF) placement; and retargeting of the layout design. In a first specific implementation, analysis, such as exact and fuzzy clustering, pattern search, and patterns similarities, may be tailored to the specific downstream application (e.g., OPC, hotspot detection, etc.). In a second specific implementation, analysis of the signatures may be based on comparison with other signatures with known properties (e.g., signatures of known hotspots).

Various types of analysis are contemplated. In one type, the signatures (including the series of values for the respective signatures) may be compared with other signatures (such as other signatures in the same layout design or other signatures in a control set of signatures) to determine similarity. In another type, machine learning may be used for the analysis. For example, one or more machine learning methodologies may be used to generate mathematical models directed to the different downstream applications (e.g., an OPC mathematical model directed to determining, based on signatures generated to extract features relevant to OPC, whether the respective signatures indicate a "good geometry" or a "bad geometry"; a hotspot mathematical model directed to determining, based on signatures generated to extract features relevant to hotspot detection, whether the respective signatures indicate a "hotspot" or a "good pattern"). In the example of training a hotspot mathematical model, the machine learning methodology may use a training dataset that includes signature data corresponding to known hotspots and signature data corresponding to known good patterns in order to generate the hotspot mathematical model.

In some embodiments, one or more geometrical parameters associated with the POI (such as measurements anchored to the POI) may be used to capture the context around or associated with the POI. Thereafter, some or all of the geometrical parameters may be analyzed for use by the downstream application. As discussed above, the POI-based analysis may be performed at various stages of the development process. For example, in the design stage, the designer may be unaware of the manufacturing specifics. In this regard, the parameter POI-based approach may focus exclusively on geometrical parameters regarding the context of the POI, and may thus be agnostic to the manufacturing specifics (including not being dependent at all on light exposure or process specifics for manufacturing). In this way, the parameter POI-based approach may perform one or both of the following during the design stage: (1) identify potential problem design areas in the layout design; and/or (2) modify the identified problem design areas.

Performing the parameter POI-based approach, during a design stage and in advance of performing another POI-based approach (such as the kernel POI-based approach discussed above) during the manufacturing stage, may reduce the number of potential problem design areas and/or the severity of potential problem design areas that may need to be addressed during the manufacturing stage. Thus, the parameter POI-based approach, even with its more limited purview of information considered (e.g., exclusively geometrical parameters) may assist in the semiconductor design process.

In one or some embodiments, in applying the parameter POI-based approach, the system may tailor the obtaining and/or the analysis of the geometrical parameters in various ways including: tailoring the geometrical parameters obtained based on one or both of the type of POI or the specific downstream application; and/or tailoring the analysis based on one or both of the type of POI or the specific downstream application.

Merely by way of example, tailoring may include: (1) applying a knowledge-based approach whereby for each POI type, different features are identified and fed to the system. Through features analysis and reduction, a minimum set of features may be refined and established tailored to the downstream application; or (2) applying a more general methodology of capturing a larger set of parameters (e.g., all available parameters), with the system deciding which features are more relevant till a minimum set is obtained.

Values for the one or more geometrical parameters may comprise a POI parameter dataset that represents a compressed set of information about the layout context associated with the POI. In one or some embodiments, the compressed set of information consists of values for the geometrical parameters and specifically excludes one or both of light exposure or process specifics for manufacturing. As discussed further below, the POI may dramatically increase the information density within the small dataset. In turn, the POI parameter dataset may be used by the downstream applications, particularly during the design stage, in order to improve performance in the downstream applications for which such datasets are applied. In some embodiments, the POI parameter dataset may be tailored to one or both of the specific downstream application or the type of POI (e.g., optimized for capturing layout context around the POI). Alternatively, the POI parameter dataset is not tailored to either the specific downstream application or the type of POI, and the subsequent analysis of the POI parameter dataset is tailored to one or both of the specific downstream application or the type of POI.

Thus, in some embodiments, a standard POI parameter dataset, composed of values for a standard set of parameters and stored in a standard POI parameter data structure, may be used for each POI to capture the context around the POI for multiple downstream applications. In this way, the standard POI parameter dataset may be independent of both the type of POI and the downstream application. Thus, actual measured geometrical values may populate most or all of the entire standard POI parameter data structure; however, downstream analysis, such as machine learning, may ignore or discount the actual measured values in the POI parameter dataset in order to tailor the analysis to the specific downstream application, as discussed further below.

Alternatively, the POI parameter dataset may be tailored to one or both of the type of POI or the downstream application. Specifically, in one instance, the POI parameter dataset may be tailored based on type of POI. For example, in one or some embodiments, types of POIs include, but are not limited to, an edge-type POI (e.g., a line end POI or an edge associated with a minimum space) and a polygon-type POI (e.g., a via-type POI). In another instance, the POI parameter dataset may be tailored to the downstream application (e.g., a hotspot POI parameter dataset, which is different from and potentially a subset of the standard POI parameter dataset, may include parameters tailored to determine hotspot detection). In still another instance, the POI parameter dataset may be tailored to both type of POI and downstream application. In particular, for a lithography application (including an application that is directed to movement of edges), the type of POI modeled using the geometrical parameters may be an edge-type POI. In contrast, for dishing in the context of chemical mechanical planarization (CMP), the type of POI modeled using the geometrical parameters may be a polygon-type POI.

Various parts of the layout may thus be treated differently dependent on the downstream application. As one example, a via (or other small opening) may be treated differently depending on the downstream application. In particular, responsive to a first type of downstream application, such a downstream application that analyzes CMP planarity, the via may be modeled at the polygon level with a polygon-type POI, such as modeling CMP planarity variation, thereby treating and analyzing the via as a whole. Likewise, in the event that the downstream application analyzes the capacitance of a part of the layout, such as a via or a non-via, the part of the layout (such as the via) may be modeled at the polygon level with the polygon-type POI. In contrast, responsive to a second type of downstream application, the via may be modeled at the edge level with an edge-type POI (where the via itself may be divided into a discrete set of edges), such as a lithographic model whereby edges of the via may change or move, with every edge of the via potentially being changed independently.

As one example, actual measured geometrical values may populate parameters in the standard POI parameter data structure relevant to the downstream application and null values may populate parameters in the standard POI parameter dataset that are not relevant to the downstream application. As another example, the standard POI parameter dataset may include parameters common to multiple downstream applications, and may be supplemented based on the specific downstream application (e.g., the set of parameters may be extended to accommodate a certain category of POIs, such as, for example, in detecting insufficient line-via overlay, in which additional measurements related to via(s) may be added to the set of parameters such as via size, and distance from via to the POI in addition to the overlay area, which may supplement the standard POI parameter dataset). In this way, the POI parameter dataset may comprise a data structure for a large number of unique parameters, with values for each geometrical parameter in the POI parameter dataset representing a compressed set of information about the layout context.

As still one example, different downstream applications may have different associated POI datasets (composed of values for a specific sets of parameters). In particular, a specific lithographic application POI parameter dataset may include values for parameters tailored to the specific lithographic application (with values stored in a corresponding specific lithographic application POI parameter data structure or stored in a standard POI parameter dataset with additional null values stored). In contrast, a hotspot POI parameter dataset may include values for parameters tailored to hotspot detection (with values stored in a corresponding hotspot POI parameter data structure or stored in a standard POI parameter dataset with additional null values stored). In this way, the POI parameter dataset, composed of geometrical values for a specific set of parameters, may be tailored to the specific downstream application. As another example, the system may identify a type of POI and obtain geometrical values corresponding to the type of POI. In some embodiments, the type of POI may be specific to a specific downstream application. For example, the following are different type of POIs as locations for potential hotspots in hotspot detection including: (i) Line-End Pull Back hotspot (see, for example, FIGS. 12A-N, discussed further below); (ii) Line's Pinching/nicking hotspot; (iii) Lines bridging hotspot; and (iv) insufficient line-via overlay hotspot. In other embodiments, the type of POI may be common to downstream applications.

Similarly, the analysis of the POI parameter dataset (e.g., whether the standard POI parameter dataset or the tailored POI parameter dataset) may be tailored to the specific downstream application. In some embodiments, machine learning may be tailored in any one of the following ways: (1) to the specific downstream application; (2) to the specific type of POI; or (3) to the specific type of POI for the specific downstream application. As one example, a machine learning methodology may use a training dataset, that includes POI parameter data corresponding to known hotspots and POI parameter data corresponding to known good patterns, in order to train a machine learning model tailored to hotpot detection. As another example, a machine learning methodology may use a training dataset, that includes POI parameter data corresponding to known Line-End Pull Back hotspots and POI parameter data corresponding to known non-Line-End Pull Back hotspots, to train a machine learning model tailored to Line-End Pull Back hotspot detection.

As still another example, testing data, such as scan chain testing data, may be used in combination with parameter POI-based approach in order to identify problematic parts of the layout design. In particular, scan chain testing may amass enormous amounts of data as to potential errors from Automatic Test Pattern Generation (ATPG) on the actual working dies. In turn, the scan chain testing data may be analyzed in order to isolate parts of the layout design, including specific combinations of edges or polygons, that result in potential errors. The identified specific combinations of edges or polygons may be translated into geometrical values that populate identified POI parameter datasets (such as a single identified POI parameter dataset or a combination of identified POI parameter datasets). As one example, through analysis of the scan chain test data, a specific structure, such as a specific type of via, may be identified as potentially prone to error (e.g., has a certain % of failing). The specific structure may be described in one or more identified POI parameter datasets (e.g., a via problematic POI dataset may be populated with the geometrical values for the specific type of via that is potentially prone to error). In practice, for the layout design under examination, POI parameter datasets may be compared to the problematic POI parameter datasets. In the example of vias in the layout design under examination, these vias may be described as geometrical parameters (e.g., each via may include a corresponding via POI parameter dataset, with geometrical values for the via populated therein). The via POI parameter datasets in the layout design may be compared with the problematic POI parameter datasets in order to determine whether there is a match (or a match within a certain tolerance) in order to conclude whether a specific via in the layout design is prone to error (e.g., has a certain % error possibility). As another example, the specific structure (identified as potentially prone to error) may be translated into an identified set POI parameter datasets (with the specific structure divided into a set of edges, with each edge in the set corresponding to one POI parameter dataset in the problematic set of POI parameter datasets). In turn, POI parameter datasets in the layout design under examination may be compared with the identified POI parameter datasets in order to determine whether they match (or are within a certain tolerance) of the problematic set of POI parameter datasets. Thus, one, some, or all of the various structures within the layout design under examination may be analyzed and ascribed a certain % potential error, and in turn ranked for potential modification.

In this way, the set of parameters and/or the analysis of the parameters may be tailored to the specific downstream application and/or the type of POI, and may sufficiently capture the context of a POI to provide the information needed to resolve a particular downstream application (e.g., pattern clustering; yield risk assessment; etc.).

Various types of geometrical parameters are contemplated. As one example, the set of parameters may include one or both of: (1) geometrical parameter(s) with respect to the polygon at which the POI exists (e.g., POI polygon's self-description); and/or (2) geometrical parameter(s) with respect to the polygon at which the POI exists relative to other polygons in the context around the POI's polygon.

For example, with regard to (1), the geometrical parameters may comprise any one, any combination, or all of: the POI itself (e.g., for a line-end POI, the length of the line end); aspects of the POI's polygon relative to the POI (e.g., horizontal or vertical line that abuts both ends of the line-end POI; a closest edge (e.g., concave or convex) to the POI; a distance from the POI to the closest edge); or the POI's polygon (e.g., the length or width of the POI's polygon; edge types of the POI's polygon).

With regard to (2), the geometrical parameters may comprise any one, any combination, or all of: a degree of closeness of the other polygons relative to the POI's polygon (e.g., a geometrical parameter related to a nearest polygon relative to the POI's polygon; a geometrical parameter related to a second nearest polygon relative to the POI's polygon); a relational geometrical parameter between other polygons and the POI's polygon (e.g., a distance, such as an edge distance from the other polygon to the POI; common run-length between the POI's polygon and the other polygon); a relational and directional geometrical parameter between other polygons and the POI's polygon (e.g., a distance from the POI's polygon to next opposite top polygon; common run-length between the POI's polygon and the next opposite top polygon); a description geometrical parameter of the other polygon (e.g., width and/or height dimensions for the other polygon; edge type of edge of other polygon nearest the POI's polygon). In this regard, a number of geometrical parameters (e.g., with respect to: (1) the polygon at which the POI exists and/or (2) the polygon at which the POI exists relative to other polygons in the context around the POI's polygon) may be least 100, at least 200, at least 230, at least 250, etc.

For instance, one data point on parameter A in the POI parameter dataset may represent the distance from the POI to a vertical polygon to the right side of the POI (an example of a parameter with respect to the polygon at which the POI exists), whereas another data point on parameter B in the POI parameter dataset may represent the distance from the POI to a concave corner below the POI (an example of a geometrical parameter with respect to the polygon at which the POI exists relative to other polygons in the context around the POI's polygon). Thus, in some embodiments, the data used as input to the downstream applications may comprise the POI parameter dataset. Alternatively, input to the downstream applications may consist of the POI parameter dataset. In particular, the data to capture the context around or associated with the POI and used for the downstream applications is limited to and consists purely of physical layout parameter inputs.

As discussed in more detail below, the geometrical parameters associated with a POI may be analyzed alone or in combination. For example, machine learning may generate a machine learning model that is configured to analyze in combination the geometrical parameters associated with the POI. Using one or more geometrical parameters in a POI parameter dataset may improve one or both of performance and efficiency in downstream applications. The POI parameter dataset may include more information captured in much less data volume, thereby resulting in downstream applications that utilize the POI parameter dataset executing much faster and using less memory than the same downstream applications that utilize traditional data sets. For example, the efficiency may result in not requiring specific knowledge or using any first principles process information, or modeling/simulation results for input. This is unlike typical processes, which may require executing another model or simulation first to create the data needed for input. Further, using the POI parameter dataset, with its many parameters of layout measurements that have specific and dense meaning regarding layout context, may provide the performance and efficiency advantage. In this way, the downstream applications, which may include other information, such as image, pattern, and litho/etch process information, do not solely rely on physical layout measurement parameter inputs.

Thus, in one or some embodiments, the POI parameter dataset may replace image or pattern capture methodologies with a set of purely physical layout measurement parameters of which each parameter in the POI parameter dataset captures a unique feature about the layout design. In addition, since the POI parameter dataset is focused on measurements, no first principles process physics information need be input as the use of the POI parameter dataset is agnostic to the physics.

Further, each geometrical parameter may be completely unique in terms of what information is being captured versus the remaining geometrical parameters in the POI parameter dataset. This uniqueness greatly increases the amount of information captured in a small set of numbers (which may be solely directed to geometrical values), inherently increasing the information density and opportunity to improve the run time and memory metrics of any modeling or simulation application applied to the POI parameter dataset. In particular, this dramatically increases the information density within the small POI parameter dataset, which may be specifically optimized for capturing layout context around a POI.

Figure 3:
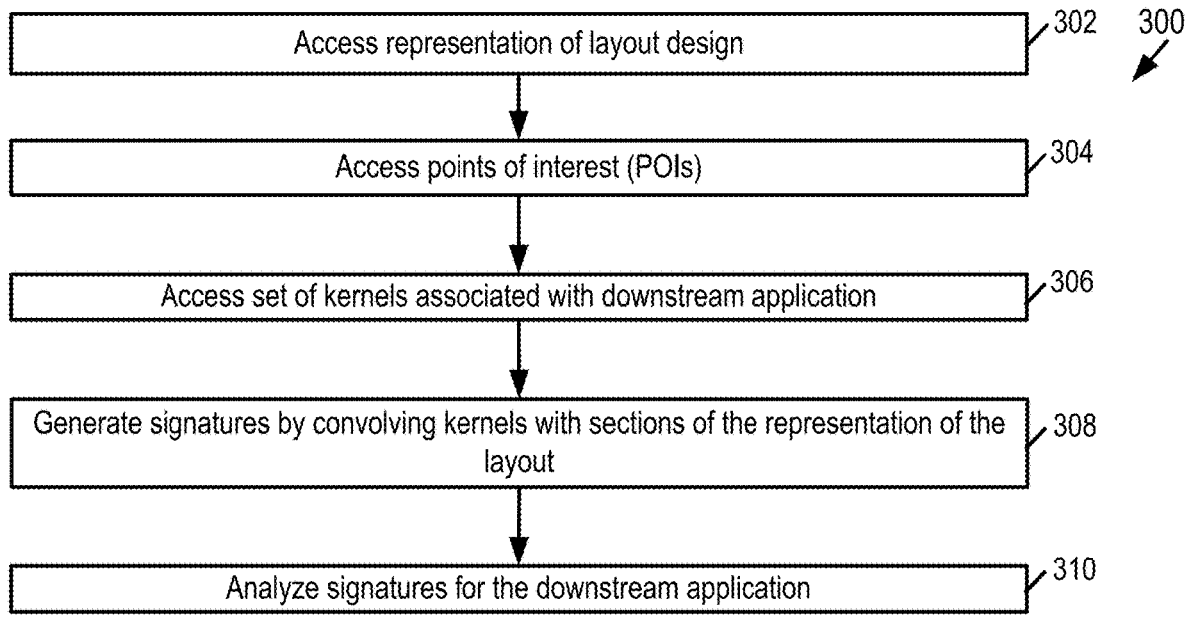
FIG. 3 is a flow chart for generating signatures by convolving kernels with a representation of the layout design and analyzing the signatures for a downstream application (e.g., to determine feature match).

Referring to back the figures, FIG. 3 is a flow chart 300 for generating signatures by convolving kernels with a representation of the layout design and analyzing the signatures for a downstream application (e.g., to determine feature match). At 302, a representation of the layout is accessed. Various representations of the layout design are contemplated. As one example, a grid may comprise one representation of the layout design in which, for a pattern file, each coordinate may represent a simple point in the grid. For example, the grid may comprise a 2-D array of dots that are equally spaced. A polygon within the layout design may be defined with regard to the grid based on where edges of the polygon are coincident with dots on the grid. Further, the resolution of the grid may be increased or decreased, resulting in greater or lesser informational density. Other representations are contemplated.

At 304, one or more POIs are accessed. In some embodiments, the system may generate and store a list of POIs for later access/analysis. Alternatively, the system may generate the list of POIs responsive to determining to generate signatures for the POIs. As one example, subsampling of the full layout design may be performed in order to determine the locations of the POIs for optimization per technology node or design layer. In some embodiments, the selection of the locations of the POIs may be performed automatically. In this regard, the POIs may be geometrically defined through a set of rules or from an output from a lithographical (e.g., model-based) simulation.

At 306, a set of kernels associated with the downstream application is accessed. As discussed above, kernels may vary in one or more aspects including any one, any combination, or all of: shape of the kernels; size of the kernels; granularity (e.g., a measure of the level of fineness to sample the grid of the layout); orientation of the kernels (e.g., orientation dependent or orientation independent); halo extension; precision; etc. In this way, the variety of kernels may be used to generate signatures for analysis in support of the specific downstream application. Further, different sets of kernels may be assigned to different downstream applications (e.g., an OPC set of kernels assigned for the OPC application; a hotspot set of kernels assigned for hotspot detection; etc.). The different sets of kernels may vary from one another and may capture features or context regarding the layout design tailored to the specific downstream application. For example, the kernels selected for a respective set may have optical and/or lithographic considerations relevant to the respective downstream application. In this way, the system may define a variety of types of kernels to capture different features, and define a variety of sets of kernels for different downstream applications.

Further, the selection of kernels may be optimized for different applications, such as for different technology nodes and/or different design layer styles (e.g., back-end-of-line (BEOL) where individual devices (e.g., transistors, capacitors, resistors, etc.) are interconnected, such as via the metallization layer, with wiring on the wafer; front-end-of-line (FEOL) where individual devices are patterned on the semiconductor, etc.). In some implementations, test data may be used to determine which kernels extract the features relevant to the specific downstream application. For example, with regard to hotspot detection, a variety of kernels may be tested using test data that is known to be a hotspot or known to be a good pattern. Responsive to testing one or more kernels (which may be a subset of the variety of kernels available) that when convolved to generate the signature, correctly indicate that the signature is indicative of hotspot or a good pattern, the one or more patterns may be assigned as the set of kernel(s) used to generate the signature for hotspot detection. Likewise with regard to OPC, kernels may be tested to identify those that when convolved to generate a signature correctly indicate a "good geometry" or "bad geometry" with regard to OPC, and may thereafter be used as the kernels to extract the features relevant for OPC determination.

At 308, signatures are generated by convolving kernels with sections of the representation of the layout. For example, computation of a numerical representation, such as a signature, at one, some, or all POIs in the layout design. As discussed further below, the kernels capture a myriad of contexts associated with the POI, which is in contrast to typical pattern-based methodologies whereby edges are the only locations where matching can be done. In turn, the signatures, generated based on the kernels, may be used for various purposes. For example, the signatures may be analyzed to determine whether or not a respective POI is aligned with a geometric shape edge, which may, in turn, be used as the matching criteria between different patterns. The computational cost of generating the signature (e.g., the feature vector) via kernels convolution is outweighed by the efficiencies in the overall flow processing time, such as by clustering, as discussed further below. In some embodiments, a special convolution algorithm is used to ensure that if the geometry around any POI is identical within kernels' extent (halo), then the collected signature has been generated without any numerical discrepancy.

At 310, the signatures may be analyzed for the downstream application. The signatures, which may comprise a series of values, may be analyzed in combination (e.g., all values are within tolerance of the values of another signature) or may be analyzed separately (e.g., if one value in the series of values for the signature is not within tolerance of the corresponding value of another signature, the other values in the series of values for the signature are not analyzed).

Figure 4:
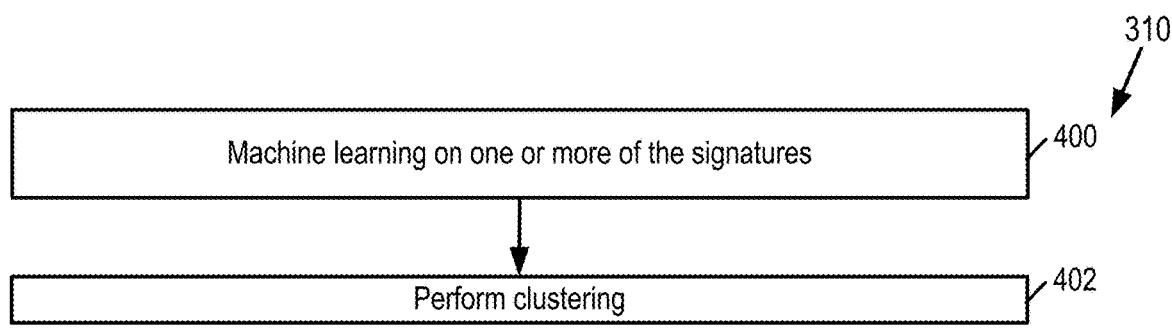
FIG. 4 is a flow chart of one example of analyzing the signatures for the downstream application.

FIG. 4 is a flow chart of one example of analyzing the signatures at 310 for the downstream application. At 400, machine learning is performed on one or more signatures. At 402, clustering is performed based on the machine learning.

As one example, the signature, based on the selection of the kernels to extract the relevant features to the specific downstream application, may accurately representing unique patterns. In some embodiments, binning or clustering may be used in analyzing the signatures. As one example of binning or clustering, a plurality of bins relevant to the downstream application may be generated, with the bins may be defined based on test data. In particular, for hotspot detection, two bins may comprise a hotspot bin and a good pattern bin. Test data of known hotspots and/or known good patterns may be used in order to define the clustering criteria for one or both of the hotspot bin and the good pattern bin (e.g., the boundaries of signature values that should be assigned to the respective bin). After defining the clustering, signatures may be analyzed for placement in a respective bin, and in turn conclusion regarding the signature. For example, after generating the range of signatures for defining the hotspot bin and the good pattern bin, analysis of a signature for a POI (unknown as to whether it indicates a hotspot or a good pattern) for placement in a respective bin indicates the determination as to whether the POI is a hotspot or a good pattern (e.g., placement of the signature for the POI in the hotspot bin indicates the POI is a hotspot; placement of the signature for the POI in the good pattern bin indicates the POI is a good pattern).

As another example of binning or clustering, a plurality of bins relevant to the downstream application may be generated, with the signatures being clustered in the respective bins for use in pattern matching. In particular, signatures within a predetermined tolerance may be assigned to the same bin resulting in the determination that the signatures assigned to the same bin share at least one similar aspect.

The clustering criteria for a respective bin (e.g., the boundaries of signature values that should be assigned to the respective bin) may be subject to testing to determine the numerical tolerance that leads to accurate clustering of similar patterns (e.g., similarity is from the perspective of the downstream applications). For example, in some embodiments, fuzzy clustering, such as iterative fuzzy clustering, may be performed. An initial tolerance or numerical delta (such as 0%) may be used in order to determine the clustering criteria. After which, the tolerance or numerical delta may be increased, such as to 5% or 10%, in order to determine the tolerance limit after which the clustering results in errors (e.g., tolerance becomes so great that signatures associated with a hotspot is clustered with signatures associated with good patterns).

The clustering may be part of a machine learning application for optimized and highly customized criteria of pattern similarity. In particular, for further reduction of the data for downstream applications, a machine learning clustering approach may be used in order to consider various aspects, such as performance and clustering results stability. Thus, signature for every POI may be generated and used in machine learning downstream flows for use in the downstream applications, such as for pattern matching, pattern analysis, layout reduction, OPC and hotspot detection. As such, the downstream applications may improve in the range of 4×-10× (e.g., clustering may improve performance). Separate from the performance boost, customizable and relevant pattern clustering results may improve consistency and accuracy of end results. In this way, the clustering techniques may provide efficient, accurate, relevant, consistent and stable (e.g., run-to-run) results.

One or both of the machine learning application or the storage of the signatures may be performed in a distributed computation environment, such as illustrated in FIGS. 1-2. In particular, to allow further operations applied on the collected data (including the signatures), a persistent database configured to operate in a distributed environment (e.g., with at least one thousand remote computers) may be use. The database may be configured to store only one unique copy of the signature generated along with locations where these signatures are originated from. This storage configuration may reduce data volume at least one order, at least two orders, or at least three orders of magnitude and may allow faster and efficient operations.

Certain features may be proximate to the POI. Other features may be more spread out in the layout design. For features that are more spread out, there are two options to consider those features. First, the kernels used to generate a signature for a respective POI may cover a larger area on the layout design; however, increasing the area may result in the generating of the signature as being too computationally expensive. Second, signatures associated with more than one POI may be grouped together in order for the analysis to account for features that are more spread out. Thus, in one embodiment, each signature is analyzed separately (e.g., one feature vector at a time for hotspot detection, OPC, etc.). Alternatively, signatures associated with different POIs may be analyzed in combination. In particular, POIs (and their associated signatures) may be grouped together based on a superimposed construction, such as a window (with an associated window size) that is moved to different parts of the grid (e.g., the window may be slid across the grid, grid-point by grid point; the window may be slid across the grid by moving a factor of the grid geometry, such as ½ the window width). POIs within the window may be considered grouped together for purposes of analysis.

As another example, clustering may be performed for a certain feature, such as type of corner (e.g., clustering convex corners separately from concave corners). Machine learning may target such type of data from the data training set. Once the model is sufficiently trained, the model may be used for layout designs that has not been seen previously in order to recognize the corner feature (e.g., convex versus concave corners). Other features that may be subject to machine learning include without limitation: the OPC correction value; SRAF (sub resolution assist feature) placement; lithographical hotspots; or retargeting of layout design (e.g., layout reduction)

Figure 5:
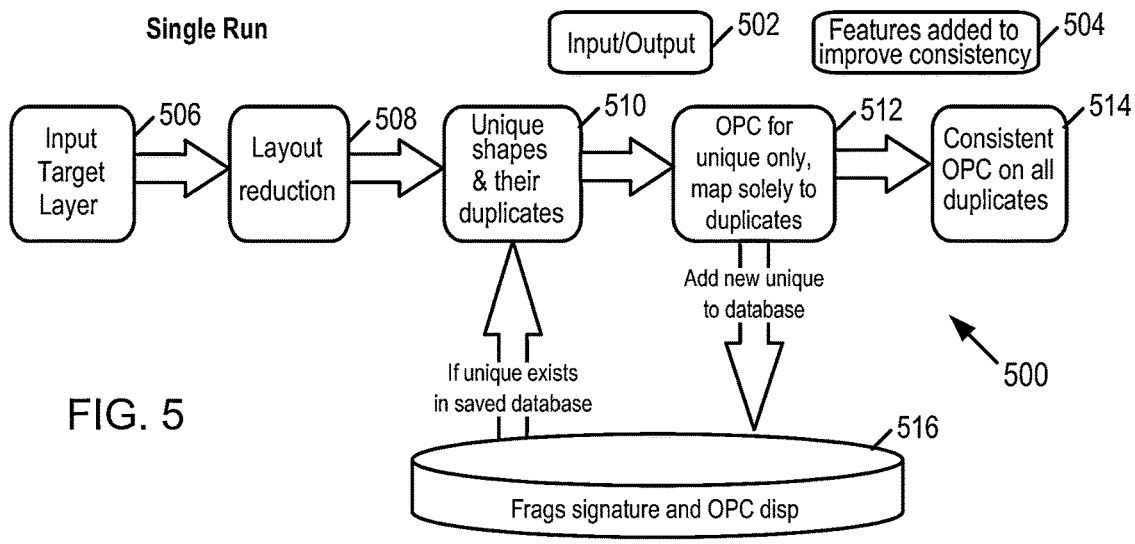
FIG. 5 is a block diagram of one example of OPC analysis.

FIG. 5 is a block diagram 500 of one example of OPC analysis, such as pattern matching that may be used in the OPC context. input/output 502 and features added to improve consistency 504 are shown in FIG. 5. At 506, the target layer is input. At 508, layout reduction may be performed. At 510, unique shapes and their duplicates are identified, such as based on analysis from frags signature and OPC display database 516. At 512, OPC may be performed only for unique shapes, with map solely to duplicates. Further, new unique shapes may be saved to frags signature and OPC display database 516. At 514, consistent OPC may be applied on all duplicates.

Figure 6A:
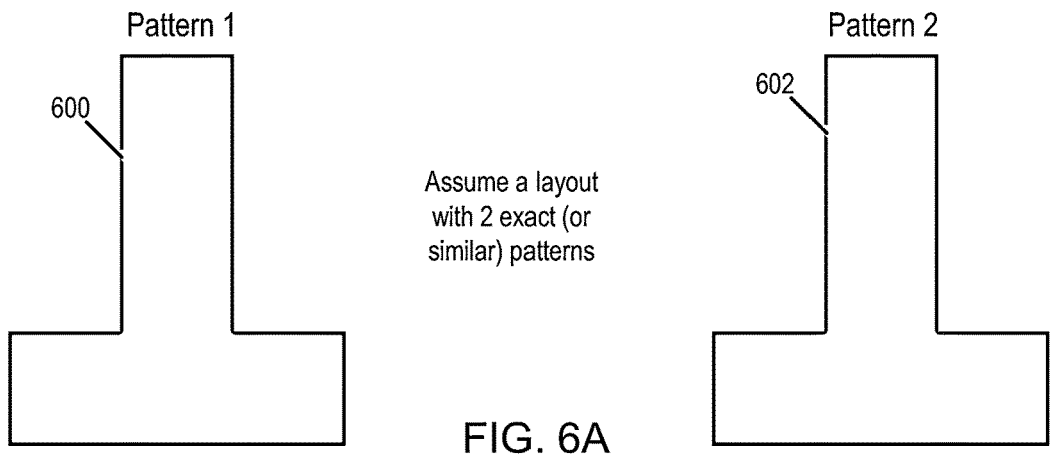
FIGS. 6A-I are a series of block diagrams to use signatures to determine feature match.
Figure 6B:
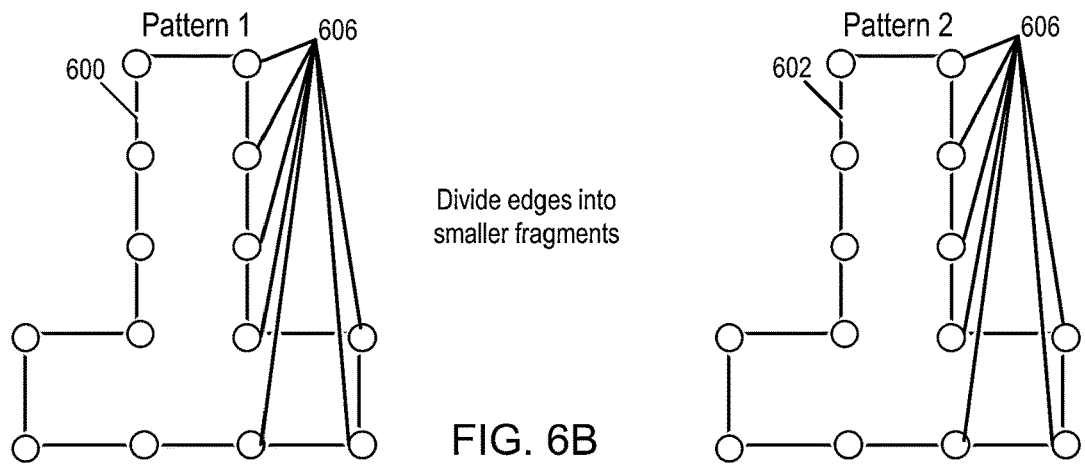
Figure 6C:
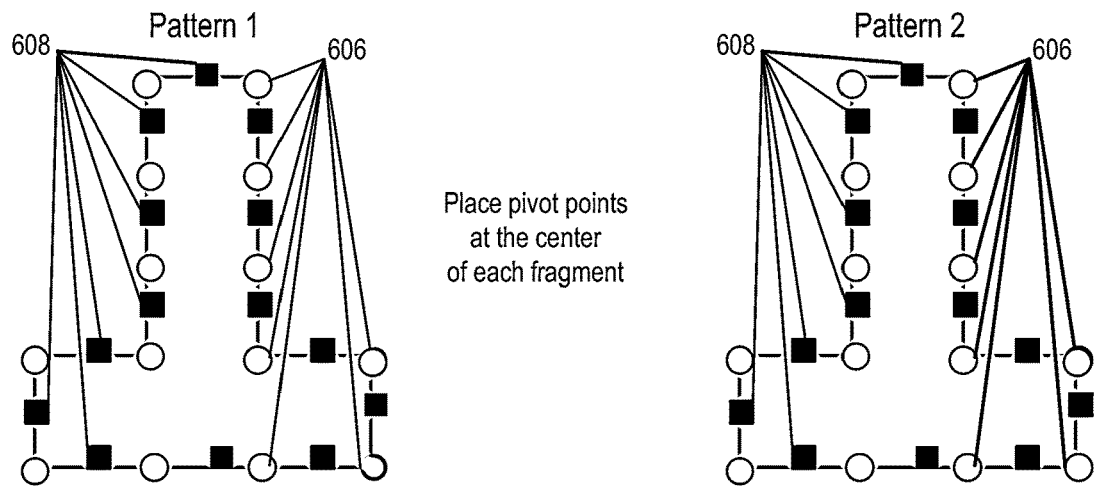

FIGS. 6A-I are a series of block diagrams to use signatures to determine feature match. For example, FIG. 6A illustrates pattern 1 (600) and pattern 2 (602), which are assumed to be the exact same (or very similar) patterns. In this regard, the respective signatures, generated by convolving the kernels with the grid of the layout design, should be identical or within a predetermined tolerance. FIG. 6B illustrates pattern 1 (600) and pattern 2 (602) with the edges divided by elements 606 to form smaller fragments. In this way, the elements 606 segment the edges of the respective patterns in order to place the POIs 608 in between, as shown in FIG. 6C. Alternatively, element 606 may be placed at each corner point of the pattern.

Figure 6D:
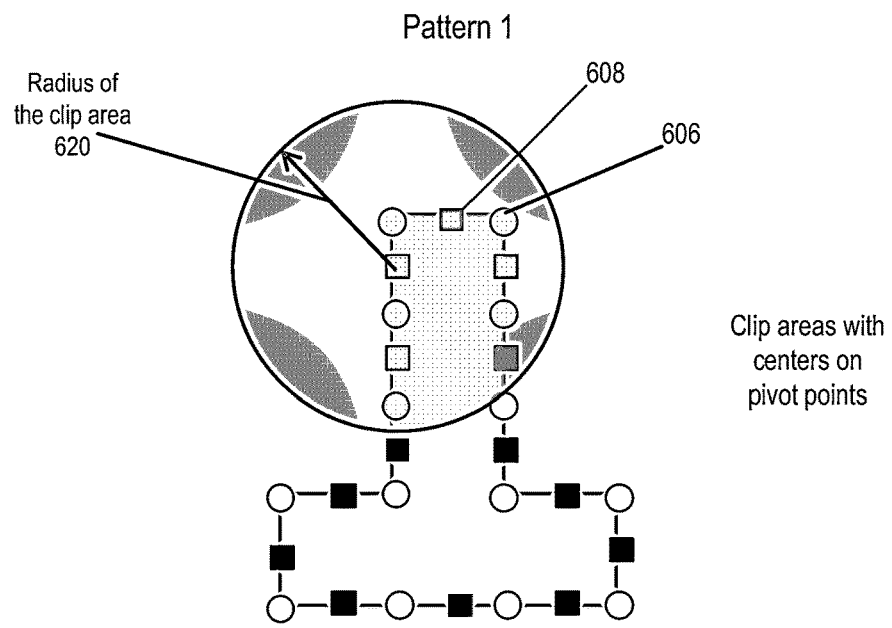

After which, areas may be clipped from the representation of the layout, such as illustrated in FIG. 6D. In particular, FIG. 6D illustrates a radius of the clip area 620 centered at a pivot point, such as a POI 608. The 2-D area may comprise the halo/context in which to extract the desired feature. Thus, the halo/context may comprise the area of interest around or in fixed relation to the POI in which the area's characteristics or features are sought.

FIG. 6D illustrates the 2-D area as a circle; however, other 2-D areas are contemplated, including a square, a rectangle, or the like. Further, the 2-D area is centered on the pivot point; alternatively, the 2-D area may be positioned relative to the pivot point, such as to the top, to the bottom, to the left, to the right, etc. of the pivot point. Further, FIG. 6D is for purposes of illustration. The 2-D area may be larger or smaller than what is depicted. For example, the radius of the clip area may be larger, such as 3 times larger, so that the clip area may account for neighbor patterns.

Figure 6E:
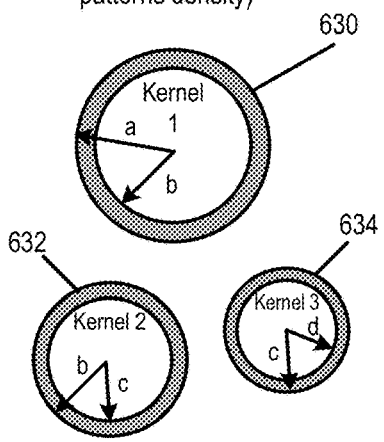
Figure 6F:
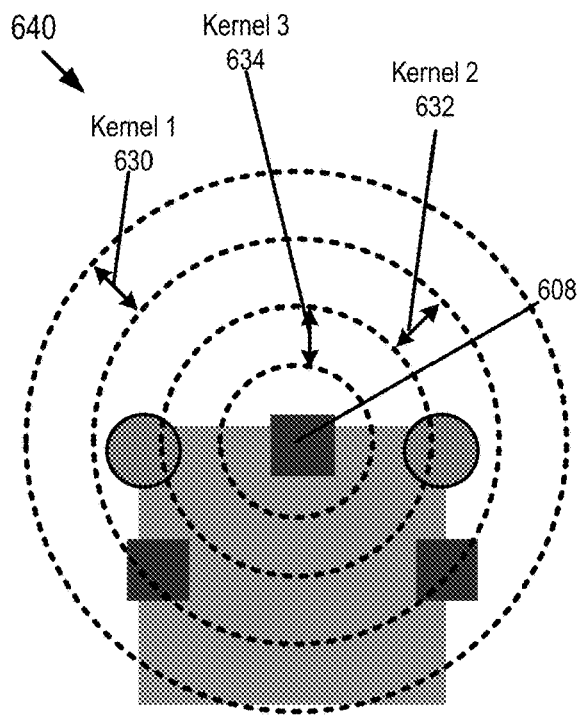

FIG. 6E illustrates a set of kernels (e.g., top hat kernels) for a specific application (e.g., OPC) to capture an aspect (e.g., patterns density) of the layout design. For example, kernel 1 (630) comprises a ring with an outer radius of "a" and an inner radius of "b", kernel 2 (632) comprises a ring with an outer radius of "b" and an inner radius of "c", and kernel 3 (634) comprises a ring with an outer radius of "c" and an inner radius of "d". Thus, the rings are concentric and do not overlap one another (e.g., are mutually exclusive of one another). Further, fewer or greater numbers of kernels are contemplated. Further, the kernels may include the region of the POI (such as a kernel internal to kernel 3 (634)). Alternatively, the kernels may include the region external to the POI in order to convolve with the regions external to the POI. FIG. 6F is an illustration 640 of the kernels superimposed on a representation of the layout design and centered at POI 608.

Thus, the number of and type of kernels selected may depend on the downstream application so that the kernels extract the desired target characteristic from the POI halo/context. As discussed above, a first downstream application may seek to obtain the context for a larger area around the POI. In such an instance, kernel 1 (630), kernel 2 (632), and kernel 3 (634) may be used. In contrast, a second downstream application may see to obtain the context for a smaller area around the POI. In such an instance, one or both of kernel 1 (630) and kernel 2 (632) (but not kernel 3 (634))

may be used. Further, various types of extractions from the representation of the layout may be performed depending on the downstream application. In particular, separate from (or in addition to) the number/shape of the kernels selected, the function for convolution (e.g., tophat; Gaussian; etc.) may be selected based on the downstream application.

The three kernels illustrated in FIG. 6F are an example of a set of three top hat kernels (assuming that this set of kernels extracts the feature from the representation of the layout relevant to the downstream application) that are centered around a POI 608. Each kernel in the example has a different inner and outer radius than the other. See FIG. 6E. Further, each kernel, when convolved with the POI, results in a density pattern in the ring of that tophat kernel. In this way, the convolution as shown in FIG. 6F is equivalent to calculating the density of the pattern within the respective ring. Dividing the area around or proximate to the POI into separate rings, the resulting signature generated includes different values, with the different values providing an indication of the density as one move away from the POI (when examining the from inner to outer rings). For ease of description, the kernels associated with one POI 608 are illustrated in FIG. 6F. Kernels centered on (or positioned relative to) one, some, or each POI in the layout design may be convolved in order to generate signatures for one, some, or each POI in the layout design. Though three kernels are illustrated in FIG. 6F, fewer or greater numbers of kernels are contemplated. For example, 4 kernels, 5 kernels, 10 kernels, 15 kernels, or more are contemplated.

Features, other than density patterns, may be extracted using different kernels. As discussed above, other types of kernels are contemplated including without limitation: Gaussian; directional Gaussian; Poisson; linear; exponential; cosine; epanechnikov; etc. In this way, kernels may vary as to the shape of the kernel as well as the type of kernel (e.g., the frequencies, whether low frequencies or high frequencies, extracted via the kernel).

In some implementations, numerically the kernel may comprise a matrix of numbers, such as illustrated in FIGS. 6J-L, which are a set of 3 tophat kernel matrices 660, 670, 680 (shown as values of "1" in different locations in the respective matrices) for convolution. FIGS. 6J-L illustrate a 9×9 matrix, with the size of the matrix being determined by the application and being a measure of how big of a context to consider around the POI. Further, each cell in the matrices 660, 670, 680 may be convoluted with a certain area of the layout, such as 1 nm×1 nm area from the layout, a 2 nm×2 nm, etc. In this regard, the area (e.g., 1 nm×1 nm; 2 nm×2 nm) may be a measure of the granularity, as discussed above.

Figure 6G:
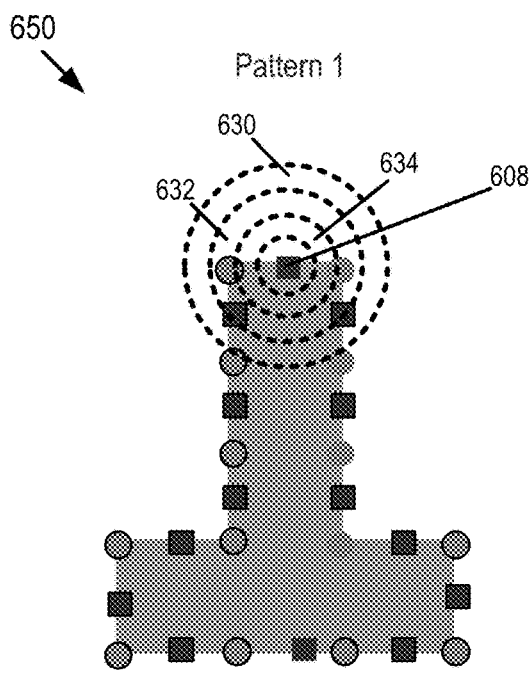
Figure 6G:
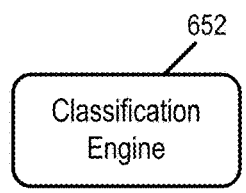

FIG. 6G is an illustration 650 of the signature, generated by convolving the kernels and the layout design, being set to the classification engine 652. As discussed above, each kernel convolved with a part of the representation of the layout design may result in a number (which may be normalized to be between 0 and 1. Thus, with three kernels as illustrated in FIG. 6G, the signature comprises 3 numbers, with each between 0 and 1, such as value1, value2, value3 (e.g., 0.25; 0.20; 0.18). As another example, convolution using fifteen kernels results in a signature with fifteen separate values (e.g., K1, K2, K3, . . . K14, K15). The signature may thus represent an encoding of the extracted feature from the representation of the layout design.

The process illustrated in FIG. 6G may be performed for all POIs in the layout design so that the signature is calculated for all POIs. The signatures may then be transmitted to the classification engine 652 for analysis, such as machine learning, which may cluster the signatures based on the desired characteristic of the POI that was extracted by the kernels. As one example, the respective values for a first signature may be compared with the respective values for a second signature (e.g., K1 value for first signature compared with K1 value for the second signature for % difference; K2 value for first signature compared with K2 value for the second signature for % difference; etc.). Depending on the comparison, the first signature may be determined to be similar or dissimilar with the second signature. Further, the comparison for different values in the signature may depend on the downstream application. As one example, values convolved from kernels closer to the POI may be weighted greater than values convolved from kernels further away from POI in order to emphasize the layout design closer to the POI greater than the layout design further away from the POI.

Figure 6H:
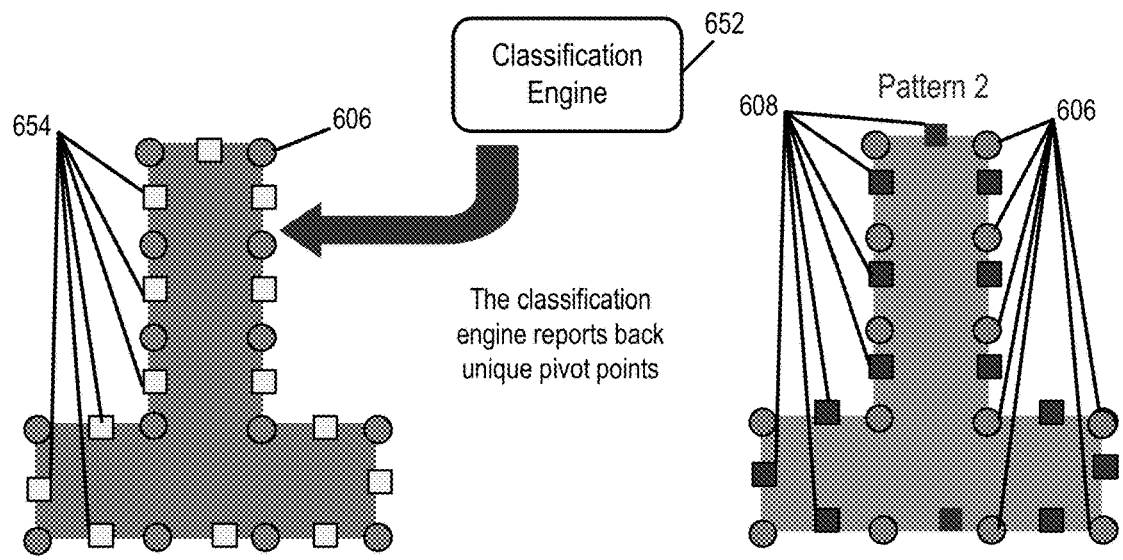

FIG. 6H illustrates that the classification engine 652 reports ack unique pivot points 654, which may indicate that there are one or more POIs that match (or match within a certain tolerance) to another POI. In this way, the matching performed is not pattern-to-pattern, but POI-to-POI (or POIs-to-POIs within a window).

Figure 6I:
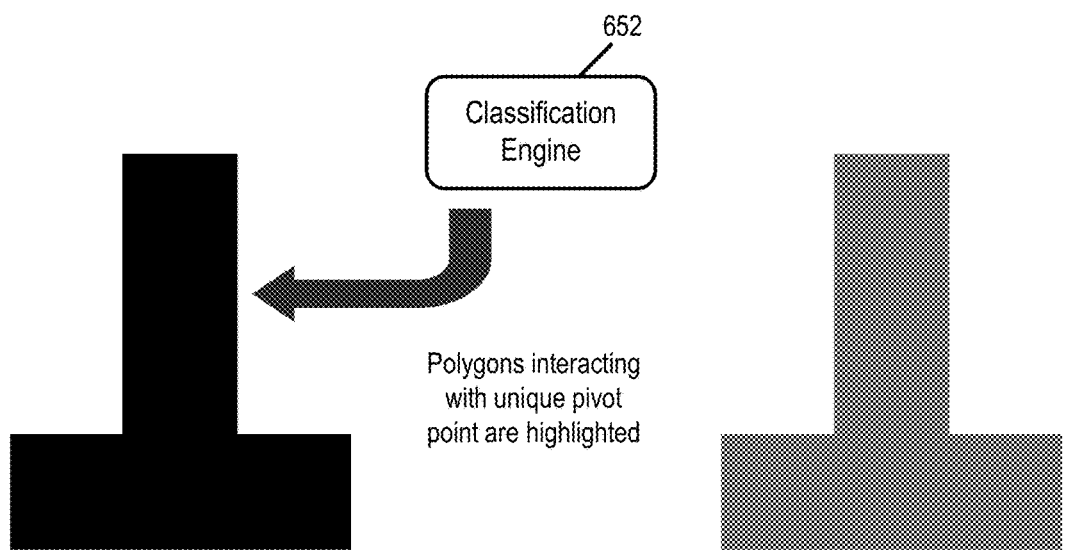

FIG. 6I illustrates that the classification engine 652 highlights polygons that interact with unique pivots. FIG. 6I illustrates two identical polygons by way of example (typically, a layout design may include much more than two identical patterns). As discussed above, for each POI, a signature is extracted by convolving the set of kernels with the representation of the layout. Further, as discussed above, POIs having the same context will have identical associated signatures. For example, kernels, selected for the downstream application, may vary based on any one, any combination, or all of: size; shape; number; or function. Two POIs, for purposes of the kernels selected, may have the same context and in turn have the same signatures. Thus, for purposes of the analysis for the downstream application, the two POIs are identical. In particular, for one downstream application, a set of two kernels, such as kernel 2 (632) and kernel 3 (634) with a certain function (e.g., tophat). If the two POIs, within the area of the two kernels are identical and the certain function extracts the same type of information, the signatures are identical and the two POIs are considered the same. In contrast, if another downstream application seeks a larger context, such as kernel 1 (630), kernel 2 (632), and kernel 3 (634), and the two POIs in that larger context are not the same (e.g., kernel 1 (630), which samples the region further away from the two POIs, is different for the two POIs), the signatures for the two POIs will be different so that the two POIs, for purposes of that another downstream application are not considered identical. In this way, the data extracted from the representation of the layout around the POI may be tailored to the downstream application so that the data extracted is relevant to the downstream application for purposes of determining similarities or differences in POIs.

Examples of this are illustrated in the tables of FIGS. 6M-N.

Specifically, one use case comprises the clustering of POIs of a full layout in different groups based on their similarity, with a goal to select a representative per each group or downsampling the existing patterns space within the layout. The samples/representatives may be used as the training data for building various types of models in the semiconductors manufacturing simulation flows. One manner of performing an objective sampling methodology comprises choosing the relevant feature vector format of the POIs based on the downstream application.

One illustrative example uses tophat kernels convolution to generate the feature vector, and thereafter numerically applying Machine Learning clustering technique to find the similar POIs. The output from this flow is the clusters count and the list of POI IDs per every cluster. The ratio between the original count of POIs and the corresponding count of clusters is called the compression ratio or downsampling ratio, whereby tuning the clustering knobs leads to different compression ratios, as illustrated in FIG. 6M. As shown, the clustering knobs may be tuned (such as downwardly tuned to increase the tolerance), which in turn reduces the number of clusters. The tuning may identify the optimum number of clusters, such as based on application-dependent working experience.

Separate from (or in addition to) the tolerance, the halo radius may likewise be tuned, such as tuning the convolution halo radius while generating the feature vector. As illustrated in the table 685 in FIG. 6M, the output of the conventional edge-based patter match is used to identify the unique POIs as the input to the feature vector generation flow. Typically, the smaller the halo leads to the smaller count of unique feature vectors, as shown in the table 690 in FIG. 6N.

Figure 7:
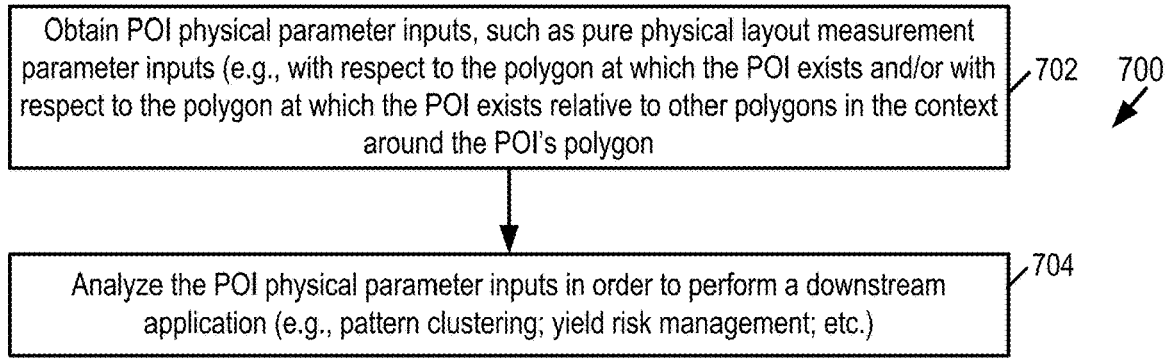
FIG. 7 is a flow diagram for obtaining POI physical parameter inputs and analyzing the POI physical parameter inputs for a downstream application.

As discussed above, there are various ways to extract information from the representation of the layout design. One way uses parameter(s) associated with the POI (such as measurements anchored to the POI) to capture the context around or associated with the POI. FIG. 7 is a flow diagram 700 for obtaining POI physical parameter inputs and analyzing the POI physical parameter inputs for a downstream application.

At 702, the POI physical parameter inputs, such as pure physical layout measurement parameter inputs, are obtained. For example, one or both of the following parameters may be obtained: (1) with respect to the polygon at which the POI exists and/or (2) with respect to the polygon at which the POI exists relative to other polygons in the context around the POI's polygon. At 704, the POI physical parameter inputs are analyzed in order to perform a downstream application (e.g., pattern clustering; yield risk management; etc.). As discussed above, various types of analysis are contemplated, including clustering, such as machine learning based clustering. The datasets used for machine learning may be based on known datasets as discussed above.

Figure 8A:
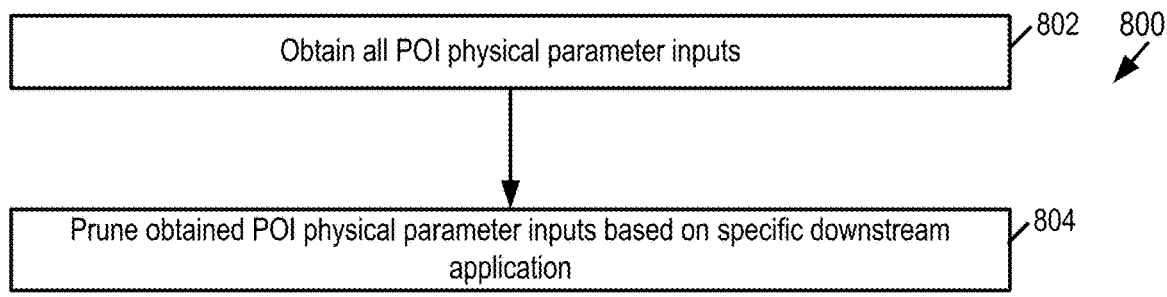
FIGS. 8A-B are flow diagrams of examples of obtaining POI physical parameter inputs.

FIG. 8A is a first example flow diagram 800 of obtaining POI physical parameter inputs. At 802, all POI physical parameter inputs are obtained. At 804, the POI physical parameter inputs obtained may be pruned based on the specific downstream application. As discussed above, there may be a variety of physical parameters, some of which are relevant to the downstream application and others not relevant to the downstream application. Thus, values for more parameters necessary for the downstream application (e.g., such as values for all parameters available) may first be obtained, and the focusing or reduction onto the subset of relevant parameters may be done thereafter (either before or during machine learning)

Figure 8B:
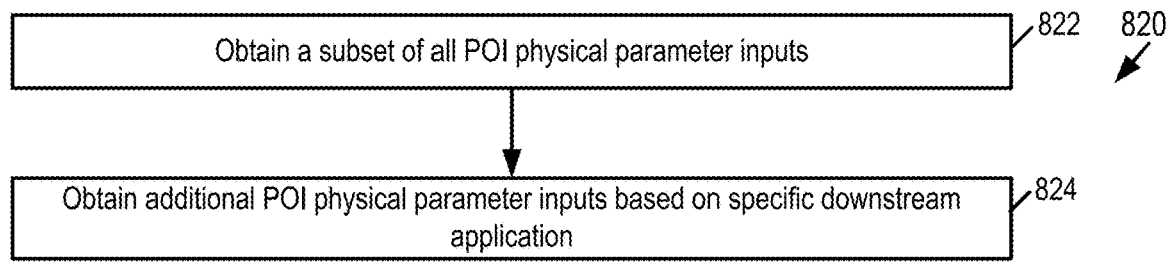

FIG. 8B is a second example flow diagram 820 of obtaining POI physical parameter inputs. At 822, a subset of all POI physical parameter inputs are obtained. At 824, additional POI physical parameter inputs are obtained based on specific downstream application. For example, the subset obtained at 822 may be selected as the group of parameters that are common to multiple downstream applications. Thereafter, additional parameter inputs obtained at 824 may be specific to the downstream application (e.g., additional measurements related to via(s) can be added to the set of parameters such as via size, and distance from the via to the POI in addition to the overlay area may supplement the standard POI parameter dataset in order to detect insufficient line-via overlay). Thus, the downstream application may dictate which parameters are input, and thereafter analyzed. In this way, one or both of the following may be downstream application dependent: (i) the parameters input; and/or (ii) the parameters considered for analysis with regard to the downstream application.

Figure 9:
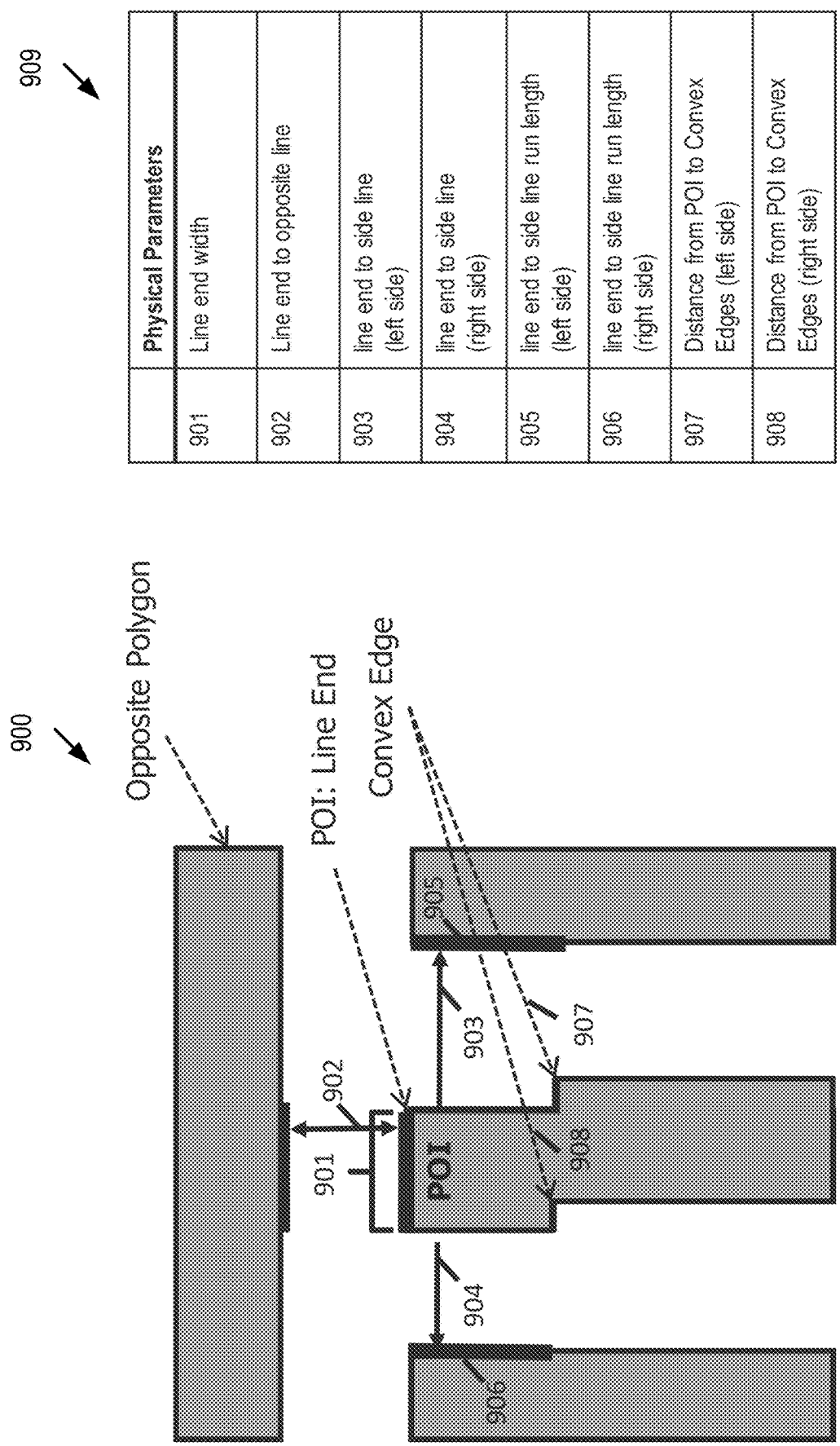
FIG. 9 is a first block diagram of an example of POI physical parameters.

Further, as discussed above, various POIs are contemplated, including various types of POIs, such as an edge-type POI (e.g., a line-edge POI) and/or a polygon-type POI (e.g., a via POI). FIG. 9 is a block diagram 900 of an example of POI physical parameters for a line end POI. Specifically, FIG. 9 illustrates physical parameters that may be input and relevant to the line end POI. FIG. 9 is merely for illustration purposes. As such, the discussion with regard to line end POI may be applied to different edge-type POIs or polygon-type POIs. The eight physical parameters illustrated in the table 909 in FIG. 9 include: (1) line end width (901); (2) line end to opposite line (902) (e.g., on a directly opposite polygon that is the polygon positioned above the polygon that includes the POI); (3) line end to a side line on the left side (903) (e.g., a distance between a neighboring polygon and the polygon that includes the POI to its left); (4) line end to a side line on the right side (904) (e.g., a distance between a neighboring polygon and the polygon that includes the POI to its right); (5) line end to side line run length on the left side (905) (e.g., a common run length for the neighboring polygon in (3) and the polygon that includes the POI); (6) line end to side line run length on the right side (906) (e.g., a common run length for the neighboring polygon in (4) and the polygon that includes the POI); (7) distance from POI to convex edges on the left side (907); and (8) distance from POI to convex edges on the right side (908). Other parameters are contemplated.

Figure 10A:
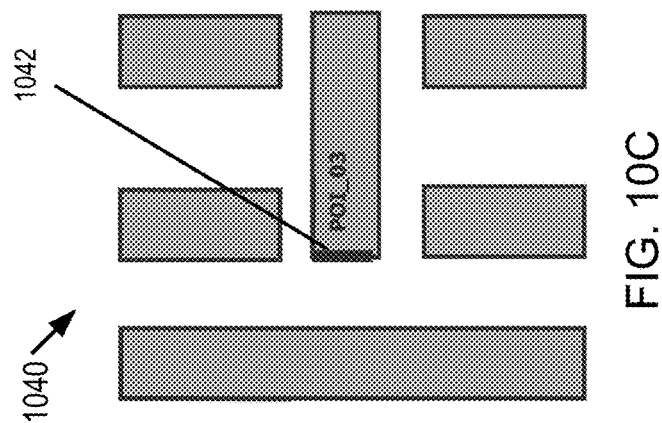
FIGS. 10A-C are layout designs showing different examples of POIs.
Figure 10B:
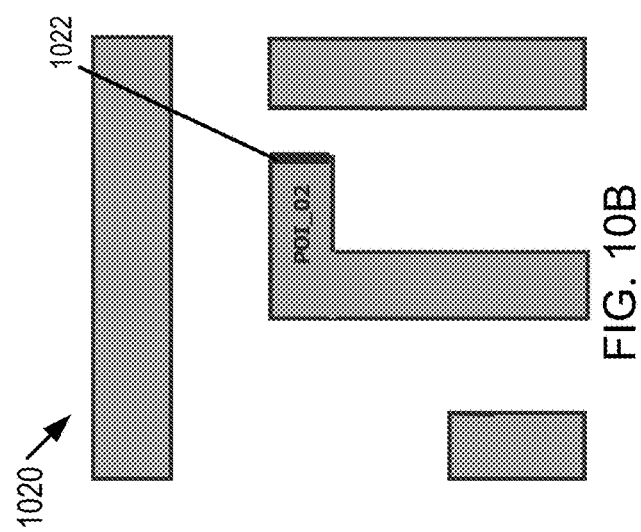
Figure 10C:
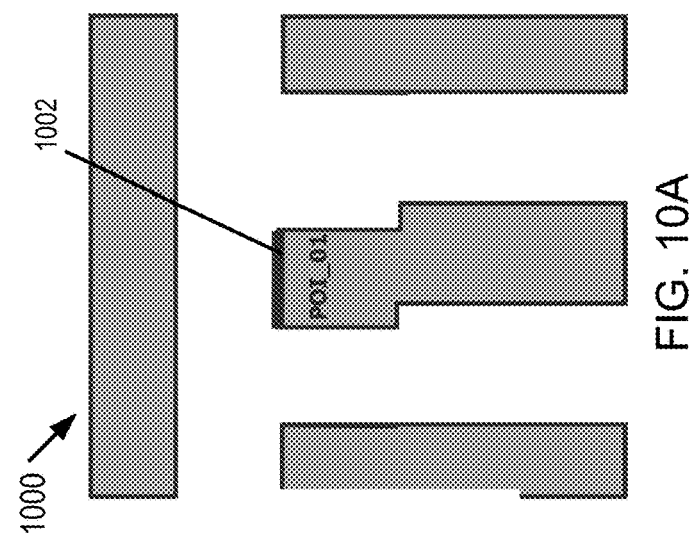

FIGS. 10A-C are layout designs 1000, 1020, 1040 showing different examples of line end POIs, including POI_01 (1002), POI_02 (1022), and POI_03 (1042).

FIG. 11 is an example table 1100 of parameter values associated with different POIs illustrated in FIGS. 10A-C. In particular, table 110 associated with POI_01 includes the eight values (in micrometers) listed in FIG. 9. The table 1100 may be in the form of a CSV file, with the data of POIs listed in row and delimited by commas. Further, the table may include values for other parameters, such as line-end extension and the pull-back. A downstream application may seek to identify the line-end pull-back. In this regard, a parameter may be added to the POI dataset, which may the line-end extension or the biasing to overcome the etching effect (e.g., which may be used for the lithographic movement of an edge).

Figure 12E:
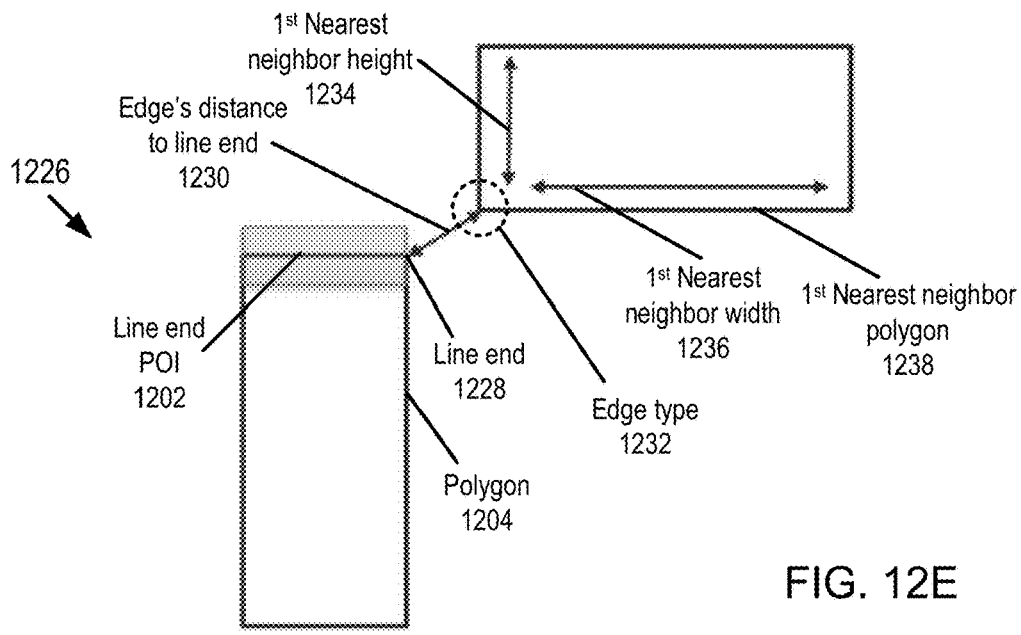
FIGS. 12A-12O are example block diagrams of parameter values associated with POIs.
Figure 12F:
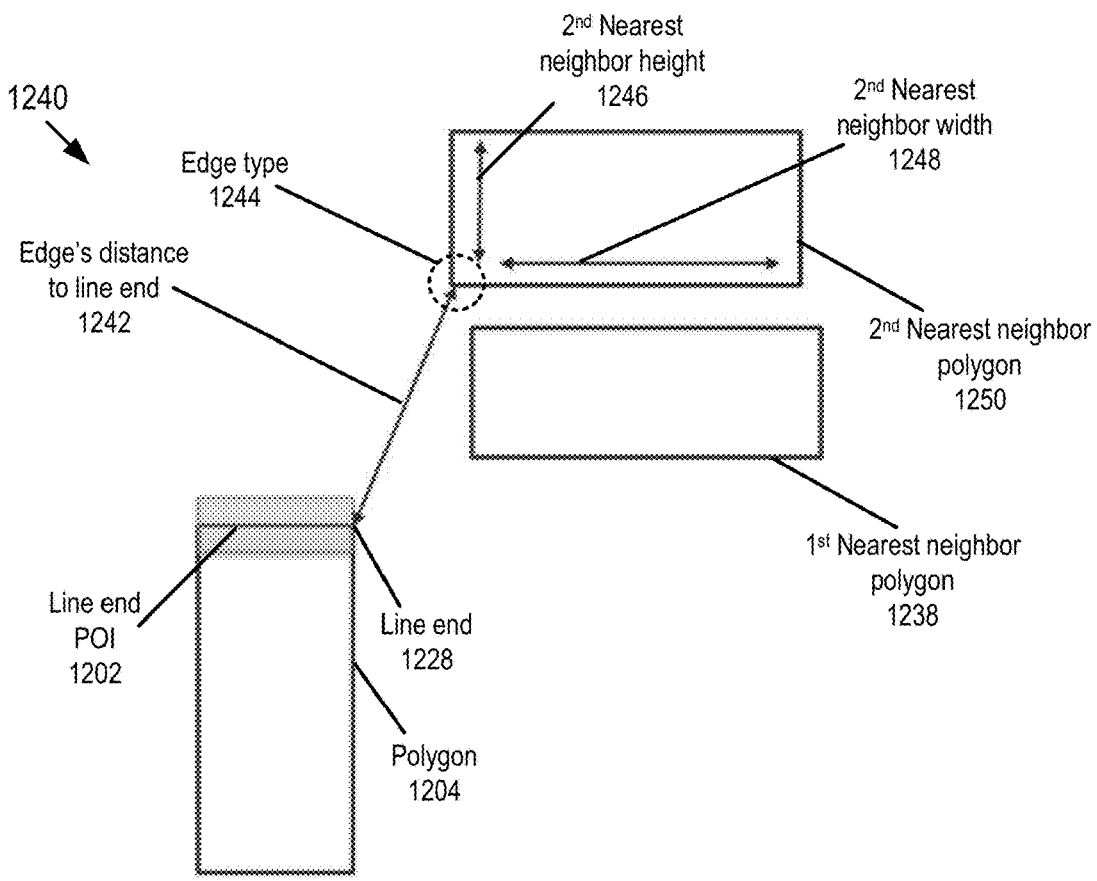
Figure 12G:
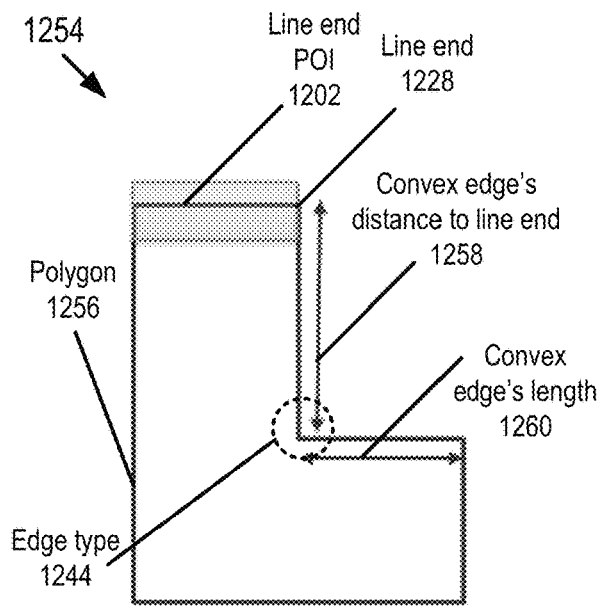
Figure 12H:
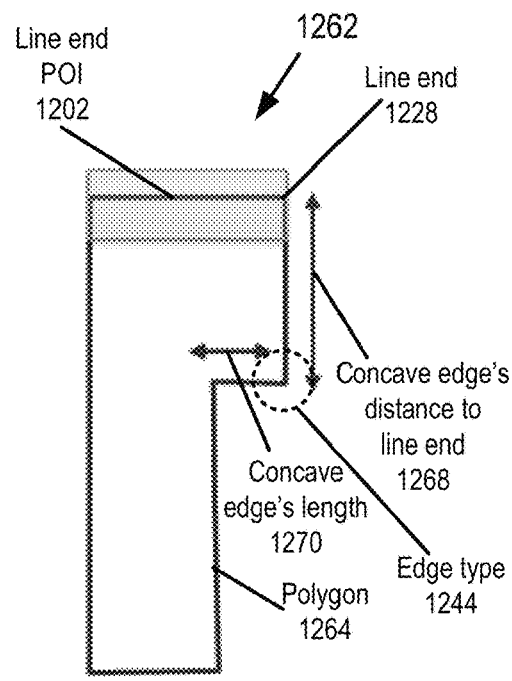
Figure 12I:
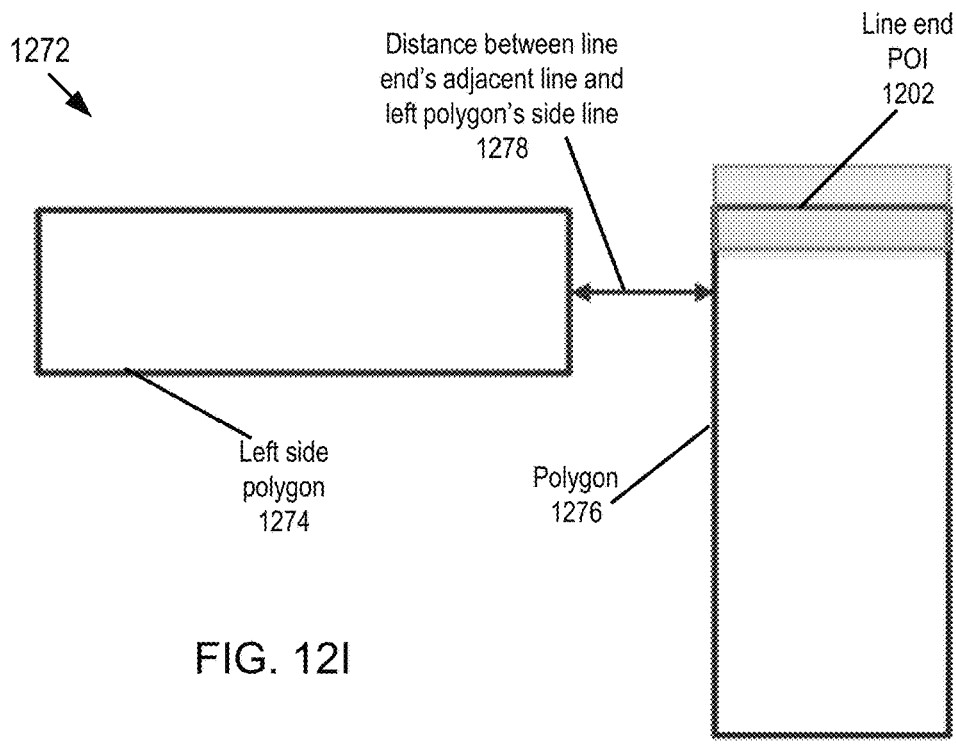
Figure 12J:
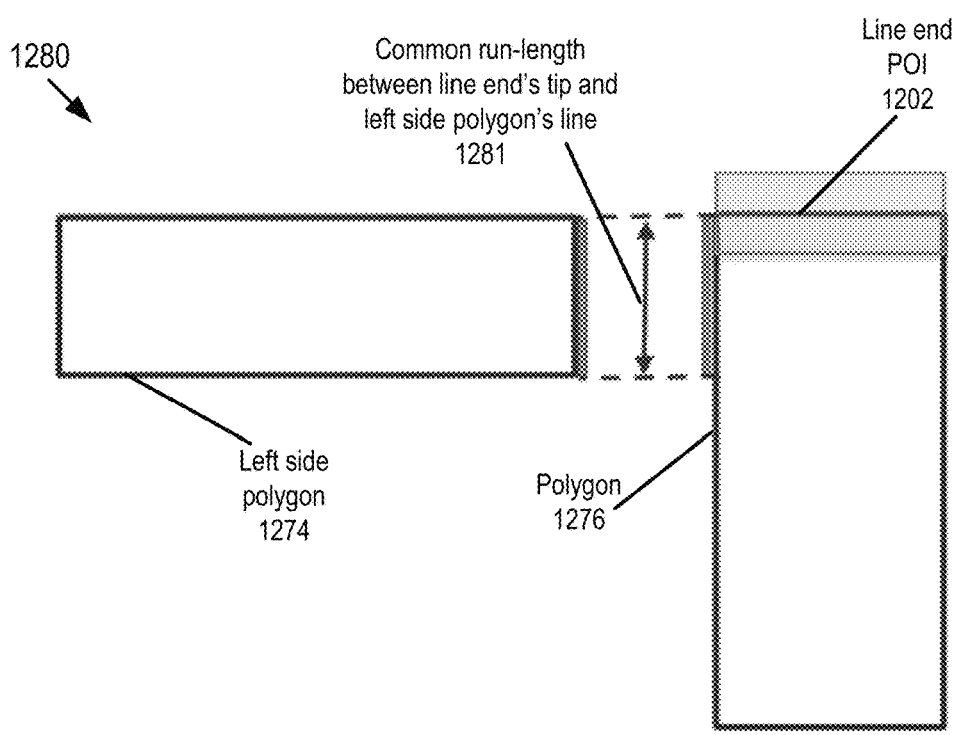
Figure 12K:
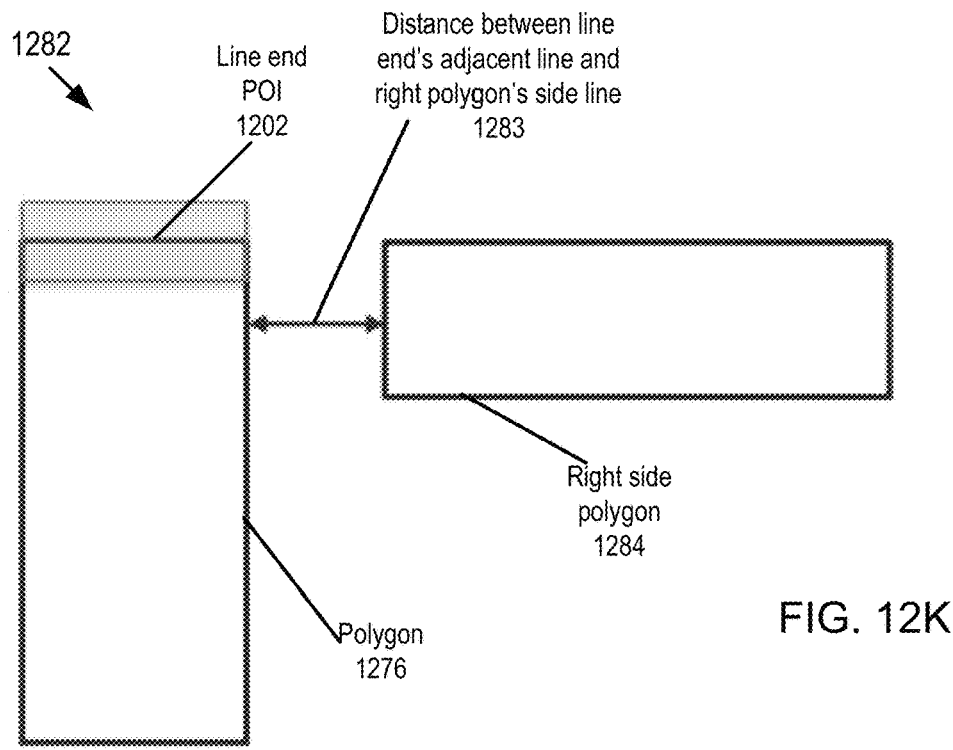
Figure 12L:
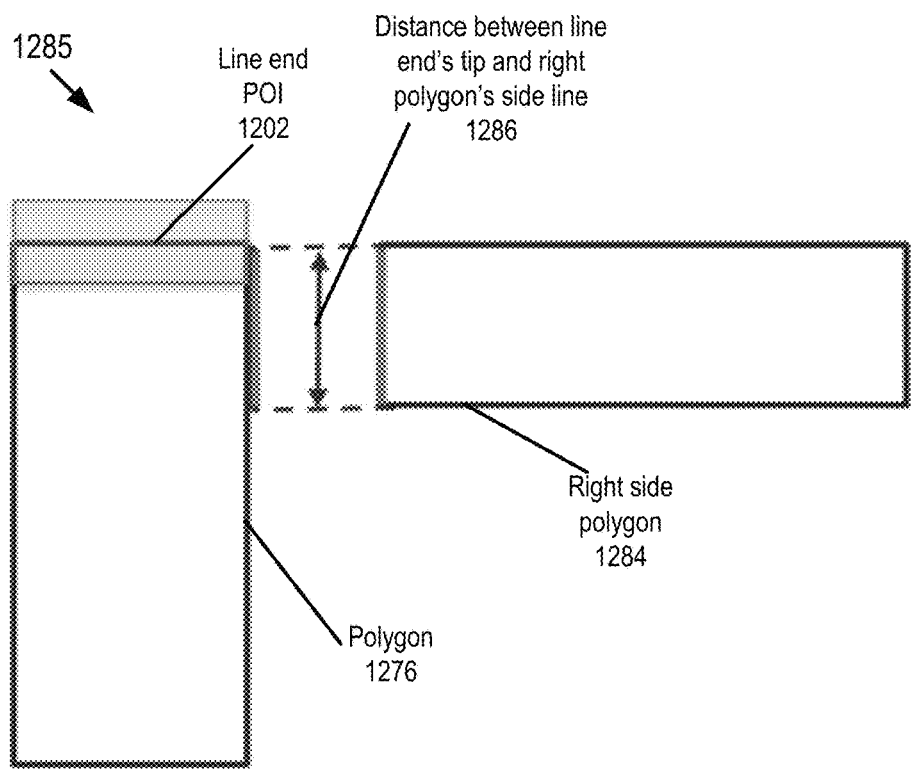
Figure 12M:
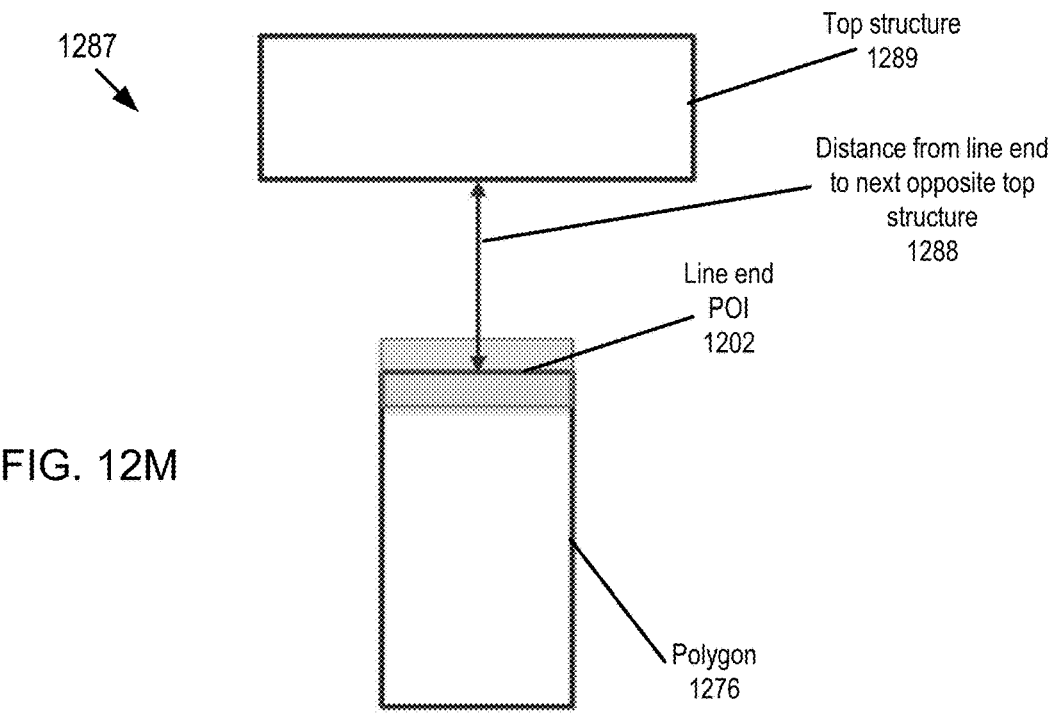
Figure 12N:
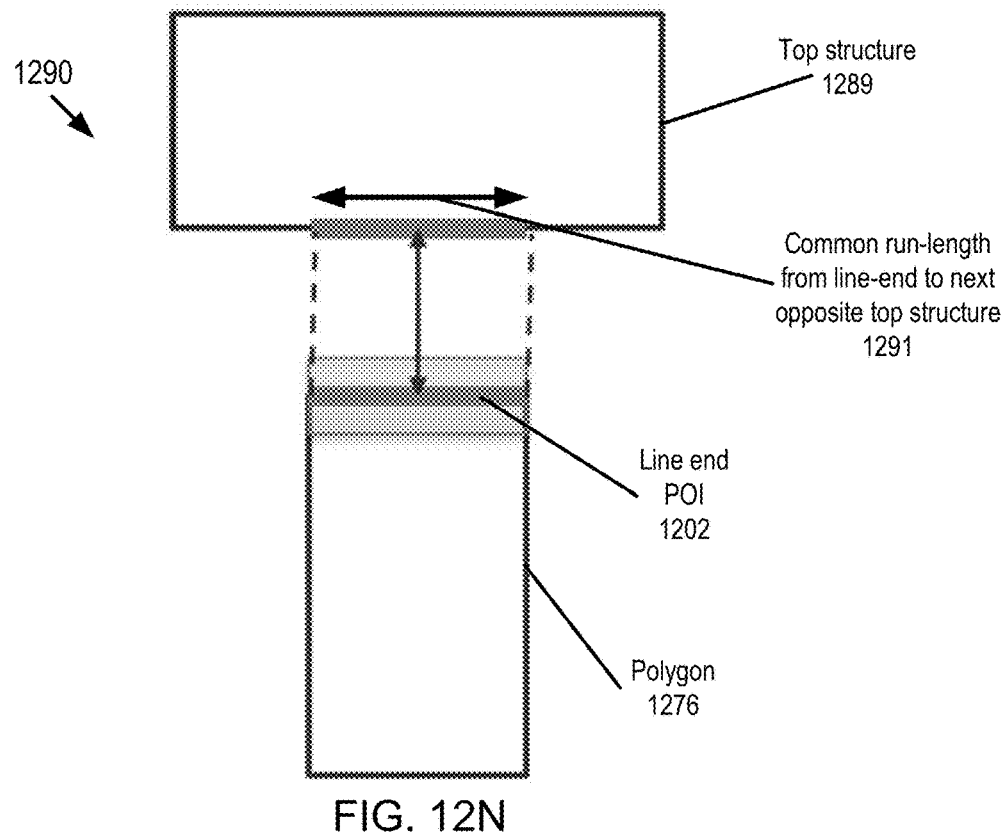
Figure 12O:
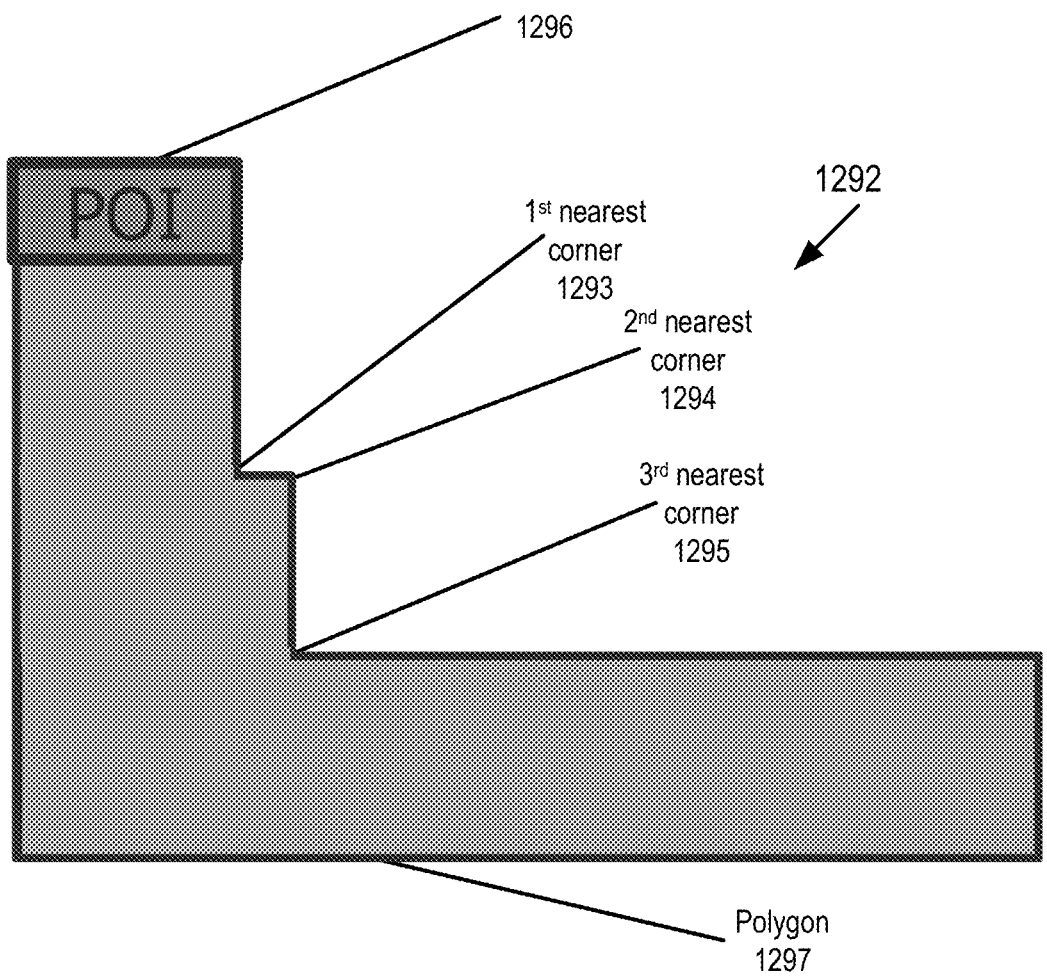

FIGS. 12A-12O are example block diagrams of parameter values associated with POIs. Specifically, FIGS. 12A-D are block diagrams 1200, 1208, 1212, 1218 for a line-end POI 1202 on polygon 1204 showing line-end self-analysis (with grey box around line-end POI 1202 highlighting the POI). Specifically, FIG. 12A illustrates for line-end POI 1202 the line end width 1206 and FIG. 12B illustrates for line-end POI 1202 the line end length 1210. FIGS. 12C-D illustrate line-end direction of propagation, such as two horizontal line-end direction of propagation (horizontal line end 1214 and horizontal line end 1216) or two vertical line-end direction of propagation (vertical line end 1220 and vertical line end 1222). Though not illustrated, a line end POI may include a combination of vertical and horizontal line-end direction of propagation, such as horizontal-vertical or vertical horizontal.

As discussed above, separate from describing the polygon at which the POI resides, the POI may be defined by neighboring polygons (e.g., measurements of the POI (or the polygon at which the POI resides) relative to the neighboring polygon or measurements describing the neighboring polygon itself). For example, FIG. 12E illustrates a block diagram 1226 and 1" nearest neighbor polygon 1238. In some embodiments, the nearest neighbor polygon may be orientation independent (e.g., the nearest polygon regardless of orientation). Alternatively, the nearest neighbor polygon may be orientation dependent (e.g., the nearest polygon to the top of the polygon at which the POI resides; the nearest polygon to the bottom of the polygon at which the POI resides; the nearest polygon to the right of the polygon at which the POI resides; the nearest polygon to the left of the polygon at which the POI resides; etc.).

Various parameters may be obtained from the line-end POI to the 1st nearest neighbor, such as the $1^{st}$ nearest neighbor corners analysis (e.g., convex and concave corners proximity (2D Structure)), which may comprise the following three properties in 4 directions (e.g., top; bottom; right; left): convex/concave edge's distance to line-end (Corner-to-Corner) (edge's distance to line end 1230); convex/concave edge's length (e.g., $1^{st}$ nearest neighbor height 1234; $1^{st}$ nearest neighbor width 1236); convex/concave edge's type (e.g., edge type 1232 indicating whether the edge is concave or convex).

Similarly, the same measurements may be performed for the second nearest neighbor. For example, FIG. 12F illustrates a block diagram 1240 and $2^{nd}$ nearest neighbor polygon 1250. In some embodiments, the $2^{nd}$ nearest neighbor polygon may be orientation independent or may be orientation dependent. Further, parameters similar to FIG. 12E may be obtained from the line-end POI to the $2^{nd}$ nearest neighbor, such as the $2^{nd}$ nearest neighbor corners analysis (e.g., convex and concave corners proximity (2D Structure)), which may comprise the following three properties in 4 directions (e.g., top; bottom; right; left): convex/concave edge's distance to line-end (Corner-to-Corner) (edge's distance to line end 1242); convex/concave edge's length (e.g., $2^{nd}$ nearest neighbor height 1246; $2^{nd}$ nearest neighbor width 1248); convex/concave edge's type (e.g., edge type 1244).

FIGS. 12G-H illustrate line-end to $1^{st}$ nearest self-corner analysis, which may comprise 3 properties in each of 4 different directions. Specifically, FIG. 12G illustrates a block diagram 1254 on polygon 1256 of convex corners proximity and FIG. 12H illustrates a block diagram 1262 on polygon 1264 of concave corners proximity.

FIG. 12G illustrates convex corner edge's length (e.g., convex edge's length 1260); convex edge's distance to line end POI (corner-to-corner) (e.g., convex edge's distance to line end POI 1258), and edge's type (e.g., edge type 1244). Similarly, FIG. 12H illustrates concave corner edge's length (e.g., concave edge's length 1270); concave edge's distance to line end POI (corner-to-corner) (e.g., concave edge's distance to line end POI 1268), and edge's type (e.g., edge type 1244). Similar parameters may be obtained for the $2^{nd}$ nearest self-corner analysis (e.g., similar to the parameters as illustrated in FIGS. 12G-H, but for the $2^{nd}$ nearest self-corner).

Parameters may also be directed to line-end border analysis, such as depicted in FIGS. 12I-L. Specifically, FIG. 12I illustrates a block diagram 1272 for a distance between the line end on polygon 1276 and a left side line on left side polygon 1274 (e.g., distance between line end's adjacent line and left polygon's side line 1278). FIG. 12J illustrates a block diagram 1280 for a common run-length between line-end's tip and left side polygon's line 1281. Similarly, FIG. 12K illustrates a block diagram 1282 for a distance between the line end on polygon 1276 and a right side line on right side polygon 1284 (e.g., distance between line end's adjacent line and right polygon's side line 1283). FIG. 12L illustrates a block diagram 1285 for a common run-length between line-end's tip and right side polygon's line 1286.

FIG. 12M illustrates a block diagram 1287 of a distance 1288 from line-end to a next opposite facing structure (e.g., top structure 1289; bottom structure; right structure; left structure; etc.). Further, FIG. 12N illustrates a block diagram 1290 of a common run-length 129 lbetween line-end's tip and to next opposite facing structure (top structure 1289).

FIG. 12O illustrates a block diagram 1292 of a POI 1296 on polygon 1297 showing the $1^{st}$ nearest corner 1293, $2^{nd}$ nearest corner 1294, $3^{rd}$ nearest corner 1295. As discussed above, for each respective corner, parameters may be generated describing the respective corner itself or the respective corner relative to the POI.

As discussed above, the parameters obtained may be analyzed individually or in combination. As one example, weights, rules, or machine learning may factor multiple parameters regarding the POI. In some embodiments, a nearest features, such as a nearest corner, may be weighted to have more of an impact than other features further (e.g., distance-wise) from the POI. Alternatively, depending on rules or machine learning, further features, such as further corners, may be weighted greater. For example, FIG. 12O shows $1^{st}$ nearest corner 1293. Without further context of other features, $1^{st}$ nearest corner 1293 may be weighted greater than other features, indicating a greater impact on the characterization of the POI. However, the system, based on machine learning or rules, may analyze other factors in determining the impact of the parameters in combination, such as any one, any combination, or all of: the corner's type; length; or space. Referring back to FIG. 12O, machine learning or derived rules may determine that the $3^{rd}$ nearest corner 1295 has more significant impact on the line-end POI than $1^{st}$ nearest corner 1293 and $2^{nd}$ nearest corner 1294.

The following example embodiments of the invention are also disclosed:

Embodiment 1

A computer-implemented method for analyzing a plurality of points of interest (POIs) in a semiconductor layout design for a downstream application, the method comprising:

accessing one or more kernels based on the downstream application, the one or more kernels when convolved with a representation of the semiconductor layout design extracting at least one feature associated with the plurality of POIs, the extracted at least one feature for use by the downstream application;

for a respective POI of the plurality of POIs, convolving the one or more kernels with the representation of the semiconductor layout design in order to generate a signature for the respective POI, the signature comprising a numerical representation indicative of the extracted at least one feature associated with the respective POI; and analyzing, based on the downstream application, the signature for the extracted at least one feature associated with the respective POI.

Embodiment 2

The method of embodiment 1, wherein a first set of kernels is configured to extract a first feature for a first downstream application in order to generate a first signature, the first signature comprising a first series of numerical values generated by convolving each kernel in the first set of kernels with the representation of the semiconductor layout design;

wherein a second set of kernels is configured to extract a second feature for a second downstream application in order to generate a second signature, the second signature comprising a second series of numerical values generated by convolving each kernel in the second set of kernels with the representation of the semiconductor layout design;

wherein the first set of kernels is different in at least one aspect from the second set of kernels;

wherein the first feature extracted from the representation of the semiconductor layout design is different from the second feature extracted from the representation of the semiconductor layout design; and wherein the first downstream application being different from the second downstream application.

Embodiment 3

The method of any of embodiments 1 and 2, wherein the first downstream application comprises hotspot detection;

wherein the first feature is indicative of whether the respective POI represents a hotspot or a good pattern;

wherein the second downstream application comprises optical proximity correction; and wherein the second feature is indicative of whether the respective POI represents good geometry or bad geometry.

Embodiment 4

The method of any of embodiments 1-3, wherein the one or more kernels comprise a set of mutually exclusive rings centered about the respective POI in order to generate the signature.

Embodiment 5

The method of any of embodiments 1-4, wherein a shape of the one or more kernels and a function of the kernels is determined based on the downstream application.

Embodiment 6

The method of any of embodiments 1-5, wherein the function of the kernels is selected from a step function or a Gaussian function.

Embodiment 7

The method of any of embodiments 1-8, wherein the shape of the kernels is selected to be orientation dependent or orientation independent based on the downstream application.

Embodiment 8

The method of any of embodiments 1-7, wherein, for a first type technology for the semiconductor layout design, a first set of kernels is accessed to convolve with the representation of the semiconductor layout design, thereby generating a first signature; and wherein, for a second type technology for the semiconductor layout design, a second set of kernels is accessed to convolve with the representation of the semiconductor layout design, thereby generating a second signature, the first set of kernels being different from the second set of kernels.

Embodiment 9

The method of any of embodiments 1-8, wherein, for a first type of layer for the semiconductor layout design, a first set of kernels is accessed to convolve with the representation of the semiconductor layout design, thereby generating a first signature; and wherein, for a second type of layer for the semiconductor layout design, a second set of kernels is accessed to convolve with the representation of the semiconductor layout design, thereby generating a second signature, the first set of kernels being different from the second set of kernels.

Embodiment 10

The method of any of embodiments 1-9, wherein analyzing, based on the downstream application, the signature for the extracted one or more features comprises clustering the signature in order to identify the one or more features extracted.

Embodiment 11

The method of any of embodiments 1-10, wherein clustering is performed based on machine learning.

Embodiment 12

The method of any of embodiments 1-11, wherein the machine learning uses a training dataset for the clustering.

Embodiment 13

One or more non-transitory computer-readable media storing computer-executable instructions for causing one or more processors performance of a method according to any of embodiments 1-12.

Embodiment 14

A system, comprising: one or more processors, the one or more processors programmed to perform a method according to any of embodiments 1-12.

Embodiment 15

A computer-implemented method for analyzing a plurality of points of interest (POIs) in a semiconductor layout design for a downstream application, the method comprising:

for a respective POI, obtaining values for one or more geometrical parameters with respect to a polygon of the respective POI and with respect to at least one other polygon in a context around the respective POI; and analyzing, based on the downstream application, the values for the one or more geometrical parameters.

Embodiment 16

The method of embodiment 15,
wherein the one or more geometrical parameters for which values are obtained are tailored based on at least one of a type of POI or the downstream application.

Embodiment 17

The method of any of embodiments 15 and 16,
wherein the one or more geometrical parameters for which values are obtained are tailored based on both of a type of POI or the downstream application.

Embodiment 18

The method of any of embodiments 15-17,
further comprising:
determining a type of POI for the respective POI; and
responsive to determining the type of POI, accessing a POI parameter dataset correlated to the determined type; and
wherein the values are obtained for geometrical parameters in the POI parameter dataset correlated to the determined type.

Embodiment 19

The method of any of embodiments 15-18,
wherein the type of POI is selected from an edge-type POI and a polygon-type POI.

Embodiment 20

The method of any of embodiments 15-19,
wherein a respective part of the semiconductor layout design is determined as the edge-type POI depending on a first downstream application such that the respective part is divided into a plurality of edge POIs, with the values for the one or more geometrical parameters being obtained for each of the plurality of edge POIs for the respective part; and
wherein the respective part of the semiconductor layout design is determined as the polygon-type POI depending on a second downstream application such that the respective part is a polygon POI, with the values for the one or more geometrical parameters being obtained for the polygon POI for the respective part as a whole.

Embodiment 21

The method of any of embodiments 15-20,
wherein the respective part comprises a via.

Embodiment 22

The method of any of embodiments 15-21,
wherein the one or more geometrical parameters with respect to at least one other polygon in a context around the respective POI comprise one or more geometrical parameters of the at least one other polygon.

Embodiment 23

The method of any of embodiments 15-22,
wherein one or more geometrical parameters with respect to at least one other polygon in a context around the respective POI comprise one or more geometrical parameters of the at least one other polygon relative to the polygon of the respective POI.

Embodiment 24

The method of any of embodiments 15-23,
wherein the one or more geometrical parameters of the at least one other polygon relative to the respective POI comprise a distance between the respective POI and at least one feature on the at least one other polygon.

Embodiment 25

The method of any of embodiments 15-24,
wherein the one or more geometrical parameters with respect to at least one other polygon in a context around the respective POI comprise one or more geometrical parameters of a first nearest polygon relative to the respective POI and one or more geometrical parameters of a second nearest polygon relative to the respective POI.

Embodiment 26

The method of any of embodiments 15-25,
wherein the one or more geometrical parameters of the first nearest polygon relative to the respective POI comprise one or more geometrical parameters of the first nearest polygon and one or more geometrical parameters of the first nearest polygon relative to the respective POI; and
wherein the one or more geometrical parameters of the second nearest polygon relative to the respective POI comprise one or more geometrical parameters of the second nearest polygon and one or more geometrical parameters of the second nearest polygon relative to the respective POI.

Embodiment 27

The method of any of embodiments 15-26,
wherein the analysis for the downstream application of the semiconductor layout design consists of analysis of the one or more geometrical parameters.

Embodiment 28

The method of any of embodiments 15-27,
wherein the analysis is directed to determining whether the one or more geometrical parameters for the respective POI is indicative of a hotspot or a good pattern.

Embodiment 29

The method of any of embodiments 15-28,
wherein the analysis is performed during a design stage of development of the semiconductor layout design; and
wherein the analysis is configured to identify and correct one or more potential faults in the semiconductor layout design in order to reduce correction of the semiconductor layout design during a subsequent POI-based analysis performed for a manufacturing stage of the development of the semiconductor layout design.

Embodiment 30

One or more non-transitory computer-readable media storing computer-executable instructions when executed causing one or more processors performance of a method according to any of embodiments 15-29.

Embodiment 31

A system, comprising: one or more processors, the one or more processors programmed to perform a method according to any of embodiments 15-29.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A computer-implemented method for analyzing a plurality of points of interest (POIs) in a semiconductor layout design for a downstream application, the method comprising:
   accessing one or more kernels based on the downstream application, the one or more kernels when convolved with a representation of the semiconductor layout design extracting at least one feature associated with the plurality of POIs, the extracted at least one feature for use by the downstream application;
   for a respective POI of the plurality of POIs, convolving the one or more kernels with the representation of the semiconductor layout design in order to generate a signature for the respective POI, wherein the one or more kernels comprise a set of mutually exclusive rings centered about the respective POI in order to generate the signature, the signature comprising a numerical representation indicative of the extracted at least one feature associated with the respective POI; and
   analyzing, based on the downstream application, the signature for the extracted at least one feature associated with the respective POI.

2. The method of claim 1, wherein a first set of kernels is configured to extract a first feature for a first downstream application in order to generate a first signature, the first signature comprising a first series of numerical values generated by convolving each kernel in the first set of kernels with the representation of the semiconductor layout design;
   wherein a second set of kernels is configured to extract a second feature for a second downstream application in order to generate a second signature, the second signature comprising a second series of numerical values generated by convolving each kernel in the second set of kernels with the representation of the semiconductor layout design;
   wherein the first set of kernels is different in at least one aspect from the second set of kernels;
   wherein the first feature extracted from the representation of the semiconductor layout design is different from the second feature extracted from the representation of the semiconductor layout design; and
   wherein the first downstream application being different from the second downstream application.

3. The method of claim 2, wherein the first downstream application comprises hotspot detection; and
   wherein the second downstream application comprises optical proximity correction.

4. The method of claim 1, wherein a shape of the one or more kernels and a function of the kernels is determined based on the downstream application.

5. The method of claim 1, wherein, for a first type technology for the semiconductor layout design, a first set of kernels is accessed to convolve with the representation of the semiconductor layout design, thereby generating a first signature; and
   wherein, for a second type technology for the semiconductor layout design, a second set of kernels is accessed to convolve with the representation of the semiconductor layout design, thereby generating a second signature, the first set of kernels being different from the second set of kernels.

6. The method of claim 1, wherein, for a first type of layer for the semiconductor layout design, a first set of kernels is accessed to convolve with the representation of the semiconductor layout design, thereby generating a first signature; and
   wherein, for a second type of layer for the semiconductor layout design, a second set of kernels is accessed to convolve with the representation of the semiconductor layout design, thereby generating a second signature, the first set of kernels being different from the second set of kernels.

7. The method of claim 1, wherein analyzing, based on the downstream application, the signature for the extracted one or more features comprises clustering the signature in order to identify the one or more features extracted.

8. An apparatus comprising at least one computer-readable memory device storing instructions configured to cause one or more processing devices in a computing system to perform operations for analyzing a plurality of points of interest (POIs) in a semiconductor layout design for a downstream application comprising:
   accessing one or more kernels based on the downstream application, the one or more kernels when convolved with a representation of the semiconductor layout design extracting at least one feature associated with the plurality of POIs, the extracted at least one feature for use by the downstream application;
   for a respective POI of the plurality of POIs, convolving the one or more kernels with the representation of the semiconductor layout design in order to generate a signature for the respective POI, the signature comprising a numerical representation indicative of the extracted at least one feature associated with the respective POI; and
   analyzing, based on the downstream application, the signature for the extracted at least one feature associated with the respective POI, which includes clustering the signature in order to identify the one or more features extracted.

9. The apparatus of claim 8, wherein a first set of kernels is configured to extract a first feature for a first downstream application in order to generate a first signature, the first signature comprising a first series of numerical values generated by convolving each kernel in the first set of kernels with the representation of the semiconductor layout design;
   wherein a second set of kernels is configured to extract a second feature for a second downstream application in order to generate a second signature, the second signature comprising a second series of numerical values generated by convolving each kernel in the second set of kernels with the representation of the semiconductor layout design;

wherein the first set of kernels is different in at least one aspect from the second set of kernels;

wherein the first feature extracted from the representation of the semiconductor layout design is different from the second feature extracted from the representation of the semiconductor layout design; and wherein the first downstream application being different from the second downstream application.

10. The apparatus of claim 9, wherein the first downstream application comprises hotspot detection; and wherein the second downstream application comprises optical proximity correction.

11. The apparatus of claim 8, wherein the one or more kernels comprise a set of mutually exclusive rings centered about the respective POI in order to generate the signature.

12. The apparatus of claim 8, wherein a shape of the one or more kernels and a function of the kernels is determined based on the downstream application.

13. The apparatus of claim 8, wherein, for a first type technology for the semiconductor layout design, a first set of kernels is accessed to convolve with the representation of the semiconductor layout design, thereby generating a first signature; and wherein, for a second type technology for the semiconductor layout design, a second set of kernels is accessed to convolve with the representation of the semiconductor layout design, thereby generating a second signature, the first set of kernels being different from the second set of kernels.

14. The apparatus of claim 8, wherein, for a first type of layer for the semiconductor layout design, a first set of kernels is accessed to convolve with the representation of the semiconductor layout design, thereby generating a first signature; and wherein, for a second type of layer for the semiconductor layout design, a second set of kernels is accessed to convolve with the representation of the semiconductor layout design, thereby generating a second signature, the first set of kernels being different from the second set of kernels.

15. A computer-implemented method for analyzing a plurality of points of interest (POIs) in a semiconductor layout design for a downstream application, the method comprising:

accessing different sets of kernels based on the downstream application and types of technology for the semiconductor layout design, the one or more different sets of kernels when convolved with a representation of the semiconductor layout design extracting at least one feature associated with the plurality of POIs, the extracted at least one feature for use by the downstream application;

for a respective POI of the plurality of POIs, convolving the one or more different sets of kernels with the representation of the semiconductor layout design in order to generate multiple signatures for the respective POI, the signatures comprising numerical representations indicative of the extracted at least one feature associated with the respective POI; and analyzing, based on the downstream application, the signatures for the extracted at least one feature associated with the respective POI.

16. The method of claim 15, wherein a first set of kernels is configured to extract a first feature for a first downstream application in order to generate a first signature, the first signature comprising a first series of numerical values generated by convolving each kernel in the first set of kernels with the representation of the semiconductor layout design;

wherein a second set of kernels is configured to extract a second feature for a second downstream application in order to generate a second signature, the second signature comprising a second series of numerical values generated by convolving each kernel in the second set of kernels with the representation of the semiconductor layout design;

wherein the first set of kernels is different in at least one aspect from the second set of kernels;

wherein the first feature extracted from the representation of the semiconductor layout design is different from the second feature extracted from the representation of the semiconductor layout design; and wherein the first downstream application being different from the second downstream application.

17. The method of claim 16, wherein the first downstream application comprises hotspot detection, and wherein the second downstream application comprises optical proximity correction.

18. The method of claim 15, wherein a shape of at least one of the different sets of kernels and a function of at least one of the different sets of kernels is determined based on the downstream application.

19. The method of claim 15, wherein, for a first type of layer for the semiconductor layout design, a first set of kernels is accessed to convolve with the representation of the semiconductor layout design, thereby generating a first signature; and wherein, for a second type of layer for the semiconductor layout design, a second set of kernels is accessed to convolve with the representation of the semiconductor layout design, thereby generating a second signature, the first set of kernels being different from the second set of kernels.

20. The method of claim 15, wherein analyzing, based on the downstream application, the signature for the extracted one or more features comprises clustering the signature in order to identify the one or more features extracted.

* * * * *